US008288000B2

(12) United States Patent
Ragunathan et al.

(10) Patent No.: US 8,288,000 B2
(45) Date of Patent: Oct. 16, 2012

(54) COATING COMPOSITIONS EXHIBITING CORROSION RESISTANCE PROPERTIES, RELATED COATED SUBSTRATES, AND METHODS

(75) Inventors: Kaliappa G. Ragunathan, Gibsonia, PA (US); John R. Schneider, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 305 days.

(21) Appl. No.: 11/837,742

(22) Filed: Aug. 13, 2007

(65) Prior Publication Data

US 2007/0275256 A1    Nov. 29, 2007

Related U.S. Application Data

(63) Continuation of application No. 11/384,970, filed on Mar. 20, 2006, now Pat. No. 7,745,010, which is a continuation-in-part of application No. 11/213,136, filed on Aug. 26, 2005, now abandoned.

(51) Int. Cl.
*B32B 27/20* (2006.01)
*B32B 27/30* (2006.01)
*C08K 3/22* (2006.01)
*C08K 3/34* (2006.01)
*C23F 11/00* (2006.01)

(52) U.S. Cl. ........ 428/331; 428/328; 428/330; 428/689; 428/697; 428/702; 524/492; 252/388; 252/389.1; 252/389.3; 252/389.31; 252/389.52; 252/389.53

(58) Field of Classification Search .................. None
See application file for complete search history.

(56) References Cited

U.S. PATENT DOCUMENTS

| | | | |
|---|---|---|---|
| 3,424,602 A | 1/1969 | Nauroth | 106/288 |
| 3,764,574 A * | 10/1973 | Marks et al. | 524/153 |
| 4,851,262 A | 7/1989 | McFeaters | 427/217 |
| 5,401,787 A * | 3/1995 | Tonyali | 524/101 |
| 5,484,581 A | 1/1996 | Esch et al. | 423/335 |
| 5,597,512 A | 1/1997 | Watanabe et al. | 252/315.6 |
| 5,688,439 A * | 11/1997 | Chopin et al. | 516/33 |
| 5,749,937 A | 5/1998 | Detering et al. | 75/10.19 |
| 5,788,738 A | 8/1998 | Pirzada et al. | 75/331 |
| 5,851,507 A | 12/1998 | Pirzada et al. | 423/659 |
| 5,869,140 A | 2/1999 | Blohowiak et al. | 427/307 |
| 5,935,293 A | 8/1999 | Detering et al. | 75/10.19 |
| 5,984,997 A | 11/1999 | Bickmore et al. | 75/343 |
| 6,040,054 A * | 3/2000 | Odashima et al. | 428/413 |
| 6,077,341 A * | 6/2000 | Terase et al. | 106/482 |
| 6,187,438 B1 * | 2/2001 | Chopin et al. | 428/403 |
| 6,395,084 B1 | 5/2002 | Priest | 106/801 |
| RE37,853 E | 9/2002 | Detering et al. | 75/10.19 |
| 6,500,415 B2 * | 12/2002 | Ishii et al. | 424/78.03 |
| 6,569,397 B1 | 5/2003 | Yadav et al. | 423/345 |
| 6,580,051 B2 | 6/2003 | Peterson et al. | 219/121.43 |
| 6,586,483 B2 | 7/2003 | Kolb et al. | 521/91 |
| 6,652,967 B2 | 11/2003 | Yadav et al. | 428/403 |
| 6,669,823 B1 | 12/2003 | Sarkas et al. | 204/164 |
| 6,719,821 B2 | 4/2004 | Yadav et al. | 75/343 |
| 6,727,309 B1 | 4/2004 | Paiva et al. | 524/438 |
| 6,770,130 B2 * | 8/2004 | Kato et al. | 106/481 |
| 6,770,705 B2 | 8/2004 | Vanier et al. | 524/560 |
| 6,786,950 B2 | 9/2004 | Yadav et al. | 75/346 |
| 6,830,822 B2 | 12/2004 | Yadav | 428/552 |
| 6,835,458 B2 | 12/2004 | Retsch et al. | 428/447 |
| 6,916,368 B2 | 7/2005 | Vanier et al. | 106/483 |
| 7,001,666 B2 * | 2/2006 | Krienke et al. | 428/429 |
| 7,070,749 B2 | 7/2006 | Lindner et al. | 423/339 |
| 2002/0013382 A1 * | 1/2002 | Furman et al. | 522/90 |
| 2002/0137872 A1 | 9/2002 | Schneider et al. | 528/44 |
| 2003/0124043 A1 | 7/2003 | Yadav et al. | 423/263 |
| 2003/0126948 A1 | 7/2003 | Yadav et al. | 75/346 |
| 2003/0129396 A1 * | 7/2003 | Kiessling et al. | 428/375 |
| 2003/0138368 A1 | 7/2003 | Yadav et al. | 423/263 |
| 2003/0158316 A1 | 8/2003 | Vanier et al. | 524/430 |
| 2003/0162015 A1 | 8/2003 | Vanier et al. | 428/327 |
| 2003/0166758 A1 | 9/2003 | Barkac et al. | 524/430 |
| 2003/0185990 A1 | 10/2003 | Bittner et al. | 427/385.5 |
| 2003/0207112 A1 | 11/2003 | Yadav | 428/402 |
| 2003/0229157 A1 | 12/2003 | Schneider et al. | 523/200 |
| 2004/0005485 A1 | 1/2004 | Yadav et al. | 429/12 |
| 2004/0091963 A1 | 5/2004 | McMurray et al. | 435/69.1 |
| 2004/0139821 A1 | 7/2004 | Yadav | 75/343 |
| 2004/0156986 A1 | 8/2004 | Yadav | 427/180 |
| 2004/0182285 A1 * | 9/2004 | Mazany et al. | 106/600 |
| 2005/0137291 A1 | 6/2005 | Schneider | 523/220 |
| 2005/0137298 A1 | 6/2005 | Schneider | 524/106 |
| 2006/0099429 A1 | 5/2006 | Domes et al. | 428/447 |
| 2006/0138404 A1 * | 6/2006 | Okada et al. | 257/40 |
| 2007/0048550 A1 * | 3/2007 | Millero et al. | 428/704 |
| 2007/0087201 A1 * | 4/2007 | Wimmer et al. | 428/413 |

FOREIGN PATENT DOCUMENTS

| | | |
|---|---|---|
| DE | 103 08 237 A1 | 9/2004 |
| EP | 1 479 736 A1 | 11/2004 |
| GB | 1005473 | 9/1965 |
| GB | 2 403 214 A | 12/2004 |
| WO | WO 00/69976 | 11/2000 |
| WO | WO 02/062907 A2 | 8/2002 |
| WO | WO 03/070837 A2 | 8/2003 |
| WO | WO 03/103816 A2 * | 12/2003 |

OTHER PUBLICATIONS

"An Alternative to Anodization: Sol-Gel Solutions for Metal Finishing" by Haixing Zheng et al., Metal Finishing, vol. 96, No. 12, Dec. 1998, Elsevier, New York, NY, pp. 35-36, 38.

(Continued)

*Primary Examiner* — Michael J Feely
(74) *Attorney, Agent, or Firm* — Donald R. Palladino

(57) ABSTRACT

Coating compositions are disclosed that include corrosion resisting particles such that the coating composition can exhibit corrosion resistance properties. Also disclosed are substrates at least partially coated with a coating deposited from such a composition and multi-component composite coatings, wherein at least one coating later is deposited from such a coating composition. Methods and apparatus for making ultrafine solid particles are also disclosed.

12 Claims, 3 Drawing Sheets

OTHER PUBLICATIONS

"Preparation of Colloidal Magnesium-Aluminum-Silicates by Hydrolysis of a Mixed Alkoxide" by Roger Salmon et al., Ceramics International, vol. 16, No. 3, Jan. 1990, Elsevier, Amsterdam, NL, pp. 157-163.

"Synthesis and Acidic Properties of the $SiO_2/SnO_2$ Mixed Oxides Obtained by the Sol-Gel Process. Evaluation of Immobilized Copper Hexacyanoferrate as an Electrochemical Probe" by William S. Cardoso et al., Solid State Ionics, vol. 167, No. 1-2, Feb. 12, 2004, pp. 165-173, North Holland Pub. Company, Amsterdam, NL.

* cited by examiner

COATING COMPOSITIONS EXHIBITING CORROSION RESISTANCE PROPERTIES, RELATED COATED SUBSTRATES, AND METHODS

CROSS-REFERENCE TO RELATED APPLICATION

This application is a continuation of U.S. patent application Ser. No. 11/384,970, filed Mar. 20, 2006 (now U.S. Pat. No. 7,745,010), which is a continuation-in-part of U.S. patent application Ser. No. 11/213,136, filed Aug. 26, 2005 (now abandoned), both of which are herein incorporated by reference in their entirety.

FIELD OF THE INVENTION

The present invention relates to coating compositions that comprise corrosion resisting particles such that the coating compositions exhibit corrosion resistance properties. The present invention also relates to substrates at least partially coated with a coating deposited from such a composition and multi-component composite coatings, wherein at least one coating layer is deposited from such a coating composition. The present invention is also related to methods and apparatus for making ultrafine solid particles.

BACKGROUND OF THE INVENTION

Coating systems that are deposited onto a substrate and cured, such as "color-plus-clear" and "monocoat" coating systems, can be subject to damage from the environment. For example, corrosion of a coated metallic substrate can occur as the substrate is exposed to oxygen and water present in the atmosphere. As a result, a "primer" coating layer is often used to protect the substrate from corrosion. The primer layer is often applied directly to a bare or pretreated metallic substrate. In some cases, particularly where the primer layer is to be applied over a bare metallic substrate, the primer layer is deposited from a composition that includes a material, such as an acid, such as phosphoric acid, which enhances the adhesion of the primer layer to the substrate. Such primers are sometimes known as "etch primers".

As indicated, in some cases metallic substrates are "pretreated" before a primer coating layer is applied (if such a primer coating is used). Such "pretreatments" often involve the application of a phosphate conversion coating, followed by a rinse, prior to the application of a protective or decorative coating. The pretreatment often acts to passivate the metal substrate and promotes corrosion resistance.

Historically, corrosion resistant "primer" coatings and metal pretreatments have utilized chromium compounds and/or other heavy metals, such as lead, to achieve a desired level of corrosion resistance and adhesion to subsequently applied coatings. For example, metal pretreatments often utilize phosphate conversion coating compositions that contain heavy metals, such as nickel, and post-rinses that contain chrome. In addition, the compositions used to produce a corrosion resistant "primer" coating often contain chromium compounds. An example of such a primer composition is disclosed in U.S. Pat. No. 4,069,187. The use of chromium and/or other heavy metals, however, results in the production of waste streams that pose environmental concerns and disposal issues.

More recently, efforts have been made to reduce or eliminate the use of chromium and/or other heavy metals. As a result, coating compositions have been developed that contain other materials added to inhibit corrosion. These materials have included, for example, zinc phosphate, iron phosphate, zinc molybdate, and calcium molybdate particles, among others, and typically comprise particles having a particle size of approximately a micron or larger. The corrosion resistance capability of such compositions, however, has been inferior to their chrome containing counterparts.

As a result, it would be desirable to provide coating compositions that are substantially free of chromium and/or other heavy metals, wherein the compositions can, in at least some cases, exhibit corrosion resistance properties superior to a similar non-chrome containing composition. In addition, it would be desirable to provide methods for treating metal substrates, including bare metal substrates, to improve the corrosion resistance of such substrates, wherein the method does not involve the use of chromium and/or other heavy metals.

SUMMARY OF THE INVENTION

In certain respects, the present invention is directed to primer and/or pretreatment coating compositions, such as etch-primers, comprising: (a) an adhesion promoting component; and (b) corrosion resisting particles selected from: (i) magnesium oxide particles having an average primary particle size of no more than 100 nanometers; (ii) particles comprising an inorganic oxide network comprising one or more inorganic oxide; and/or (iii) chemically modified particles having an average primary particle size of no more than 500 nanometers.

In some respects, the present invention is directed to methods for improving the corrosion resistance properties of a primer and/or pretreatment coating composition, such as an etch-primer. These methods comprise including in such a composition corrosion resisting particles selected from: (i) magnesium oxide particles having an average primary particle size of no more than 100 nanometers; (ii) particles comprising an inorganic oxide network comprising one or more inorganic oxide; and/or (iii) chemically modified particles having an average primary particle size of no more than 500 nanometers, such that the corrosion resisting particles are present in the composition in an amount sufficient to result in a composition that, when deposited onto at least a portion of one metal substrate selected from cold rolled steel, electrogalvanized steel and aluminum and cured, provides a substrate that exhibits corrosion resistance properties at least similar to the corrosion resistance properties that the same substrate exhibits when at least partially coated under the same conditions with a conventional chrome-containing corrosion-resistant composition.

The present invention also relates to methods for enhancing the corrosion resistance of a metal substrate. Such methods comprise coating at least a portion of a bare metal substrate with a primer and/or pretreatment coating composition that comprises (a) an adhesion promoting component, and (b) corrosion resisting particles selected from: (i) magnesium oxide particles having an average primary particle size of no more than 100 nanometers; (ii) particles comprising an inorganic oxide network comprising one or more inorganic oxide; and/or (iii) chemically modified particles having an average primary particle size of no more than 500 nanometers.

DETAILED DESCRIPTION OF EMBODIMENTS OF THE INVENTION

Figure 1:
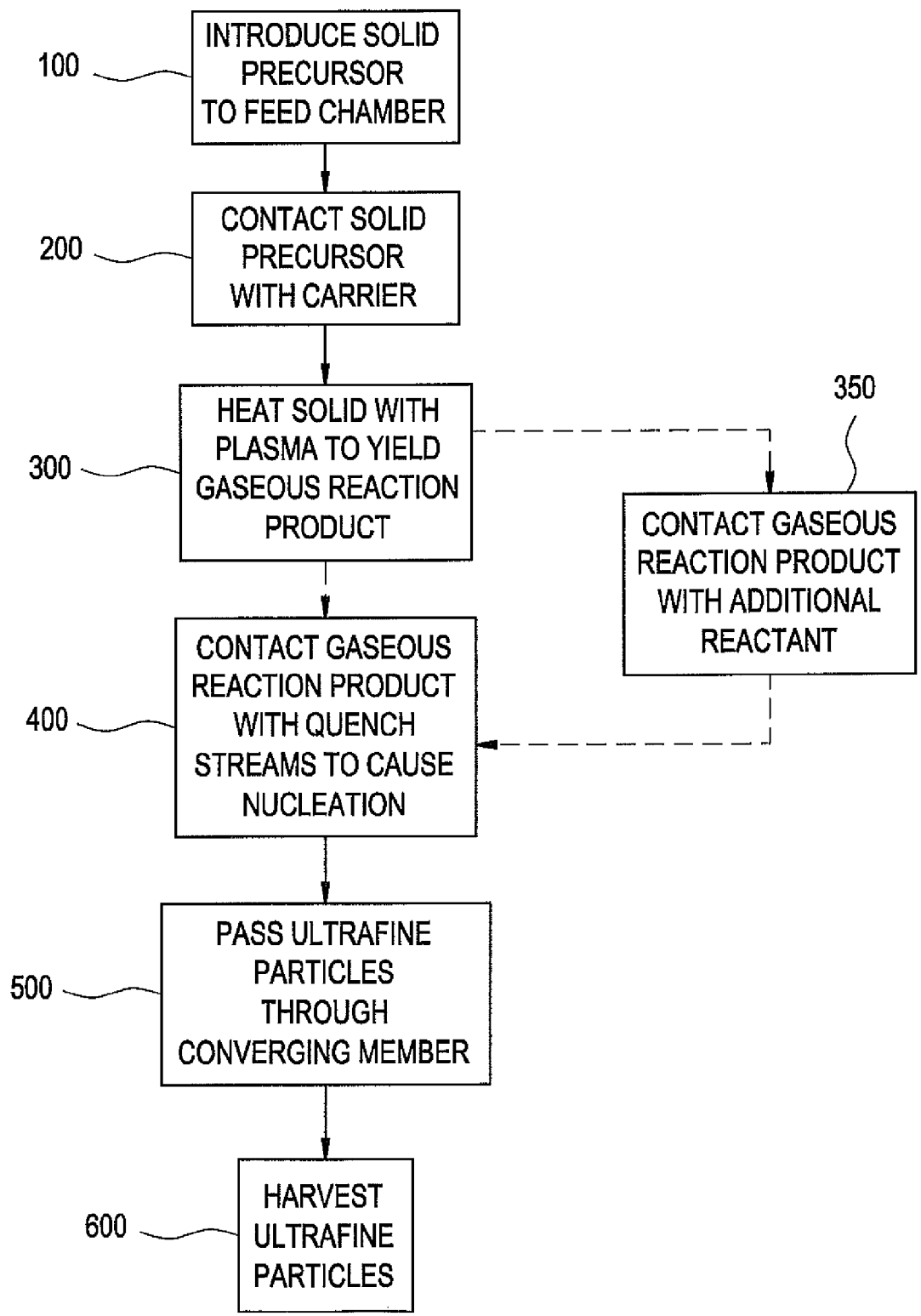
FIG. 1 is a flowchart depicted the steps of certain methods for making ultrafine solid particles in accordance with certain embodiments of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to coating compositions that, in certain embodiments, comprise a "film-forming resin." Such references to "a film-forming resin" is meant to encompass coating compositions comprising one film-forming resin as well as coating compositions that comprise a mixture of two or more film-forming resins. In addition, in this application, the use of "or" means "and/or" unless specifically stated otherwise, even though "and/or" may be explicitly used in certain instances.

In certain embodiments, the present invention is directed to coating compositions that are substantially free of chromium containing material. In other embodiments, the coating compositions of the present invention are completely free of such a material. As used herein, the term "substantially free" means that the material being discussed is present in the composition, if at all, as an incidental impurity. In other words, the material does not affect the properties of the composition. This means that, in certain embodiments of the present invention, the coating composition contains less than 2 weight percent of chromium containing material or, in some cases, less than 0.05 weight percent of chromium containing material, wherein such weight percents are based on the total weight of the composition. As used herein, the term "completely free" means that the material is not present in the composition at all. Thus, certain embodiments of the coating compositions of the present invention contain no chromium-containing material. As used herein, the term "chromium containing material" refers to materials that include a chromium trioxide group, $CrO_3$. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate.

Certain embodiments of the coating compositions of the present invention are substantially free of other undesirable materials, including heavy metals, such as lead and nickel. In certain embodiments, the coating compositions of the present invention are completely free of such materials.

As indicated, the coating compositions of the present invention comprise "corrosion resisting particles." As used herein, the term "corrosion resisting particles" refers to particles which, when included in a coating composition that is deposited upon a substrate, act to provide a coating that resists or, in some cases, even prevents, the alteration or degradation of the substrate, such as by a chemical or electrochemical oxidizing process, including rust in iron containing substrates and degradative oxides in aluminum substrates.

In certain embodiments, the present invention is directed to coating compositions that comprise corrosion resisting particles comprising an inorganic oxide, in some embodiments a plurality of inorganic oxides, such as, for example, zinc oxide (ZnO), magnesium oxide (MgO), cerium oxide ($CeO_2$), molybdenum oxide ($MoO_3$), and/or silicon dioxide ($SiO_2$), among others. As used herein, the term "plurality" means two or more. Therefore, certain embodiments of coating compositions of the present invention comprise corrosion resisting particles comprising two, three, four, or more than four inorganic oxides. In certain embodiments, these inorganic oxides are present in such particles, for example, in the form of a homogeneous mixture or a solid-state solution of the plurality of oxides.

In certain embodiments of the coating compositions of the present invention, the corrosion resisting particles comprising an inorganic oxide, or, in certain embodiments, a plurality thereof, comprise an oxide of zinc, cerium, yttrium, manganese, magnesium, molybdenum, lithium, aluminum, magnesium, tin, or calcium. In certain embodiments, the particles comprise an oxide of magnesium, zinc, cerium, or calcium. In certain embodiments, the particles also comprise an oxide of boron, phosphorous, silicon, zirconium, iron, or titanium. In certain embodiments, the particles comprise silicon dioxide (hereinafter identified as "silica").

In certain embodiments, the corrosion resisting particles that are included within certain embodiments of the coating compositions of the present invention comprise a plurality of inorganic oxides selected from (i) particles comprising an oxide of cerium, zinc, and silicon; (ii) particles comprising an oxide of calcium, zinc and silicon; (iii) particles comprising an oxide of phosphorous, zinc and silicon; (iv) particles comprising an oxide of yttrium, zinc, and silicon; (v) particles comprising an oxide of molybdenum, zinc, and silicon; (vi) particles comprising an oxide of boron, zinc, and silicon; (vii) particles comprising an oxide of cerium, aluminum, and silicon, (viii) particles comprising oxides of magnesium or tin and silicon, and (ix) particles comprising an oxide of cerium, boron, and silicon, or a mixture of two or more of particles (i) to (ix).

In certain embodiments, the corrosion resisting particles included in the coating compositions of the present invention are substantially free, or, in some cases, completely free of an oxide of zirconium. In certain embodiments, this means that the corrosion resisting particles contain less than 1 percent by weight zirconium oxide or, in some cases, less than 0.05 percent by weight zirconium oxide, wherein such weight percents are based on the total weight of the particle.

In certain embodiments of the coating compositions of the present invention, the corrosion resisting particles comprise 10 to 25 percent by weight zinc oxide, 0.5 to 25 percent by weight cerium oxide, and 50 to 89.5 percent by weight silica, wherein the percents by weight are based on the total weight of the particle. In certain embodiments, such particles are substantially free, or, in some cases, completely free of zirconium.

In other embodiments of the coating compositions of the present invention, the corrosion resisting particles comprise 10 to 25 percent by weight zinc oxide, 0.5 to 25 percent by weight calcium oxide, and 50 to 89.5 percent by weight silica, wherein the percents by weight are based on the total weight of the particle. In certain embodiments, such particles are substantially free, or, in some cases, completely free of zirconium.

In still other embodiments of the coating compositions of the present invention, the corrosion resisting particles comprise 10 to 25 percent by weight zinc oxide, 0.5 to 25 percent by weight yttrium oxide, and 50 to 89.5 percent by weight silica, wherein the percents by weight are based on the total weight of the particle. In certain embodiments, such particles are substantially free, or, in some cases, completely free of zirconium.

In yet other embodiments of the coating compositions of the present invention, the corrosion resisting particles comprise 10 to 25 percent by weight zinc oxide, 0.5 to 50 percent by weight phosphorous oxide, and 25 to 89.5 percent by weight silica, wherein the percents by weight are based on the total weight of the particle. In certain embodiments, such particles are substantially free, or, in some cases, completely free of zirconium.

In some embodiments of the coating compositions of the present invention, the corrosion resisting particles comprise 10 to 25 percent by weight zinc oxide, 0.5 to 50 percent by weight boron oxide, and 25 to 89.5 percent by weight silica, wherein the percents by weight are based on the total weight of the particle. In certain embodiments, such particles are substantially free, or, in some cases, completely free of zirconium.

In certain embodiments of the coating compositions of the present invention, the corrosion resisting particles comprise 10 to 25 percent by weight zinc oxide, 0.5 to 50 percent by weight molybdenum oxide, and 25 to 89.5 percent by weight silica, wherein the percents by weight are based on the total weight of the particle. In certain embodiments, such particles are substantially free, or, in some cases, completely free of zirconium.

In other embodiments of the coating compositions of the present invention, the corrosion resisting particles comprise 0.5 to 25 percent by weight cerium oxide, 0.5 to 50 percent by weight boron oxide, and 25 to 99 percent by weight silica, wherein the percents by weight are based on the total weight of the particle. In certain embodiments, such particles are substantially free, or, in some cases, completely free of zirconium.

In still other embodiments of the coating compositions of the present invention, the corrosion resisting particles comprise 0.5 to 25 percent by weight cerium oxide, 0.5 to 50 percent by weight aluminum oxide, and 25 to 99 percent by weight silica, wherein the percents by weight are based on the total weight of the particle. In certain embodiments, such particles are substantially free, or, in some cases, completely free of zirconium.

In yet other embodiments of the coating compositions of the present invention, the corrosion resisting particles comprise 0.5 to 25 percent by weight cerium oxide, 0.5 to 25 percent by weight zinc oxide, 0.5 to 25 percent by weight boron oxide, and 25 to 98.5 percent by weight silica, wherein the percents by weight are based on the total weight of the particle. In certain embodiments, such particles are substantially free, or, in some cases, completely free of zirconium.

In certain embodiments of the coating compositions of the present invention, the corrosion resisting particles comprise 0.5 to 25 percent by weight yttrium oxide, 0.5 to 25 percent by weight phosphorous oxide, 0.5 to 25 percent by weight zinc oxide, and 25 to 98.5 percent by weight silica, wherein the percents by weight are based on the total weight of the particle. In certain embodiments, such particles are substantially free, or, in some cases, completely free of zirconium.

In certain embodiments of the coating compositions of the present invention, the corrosion resisting particles comprise 0.5 to 75 percent by weight magnesium or tin oxide, and 25 to 99.5 percent by weight silica, wherein the percents by weight are based on the total weight of the particle. In certain embodiments, such particles are substantially free, or, in some cases, completely free of zirconium.

In some embodiments of the coating compositions of the present invention, the corrosion resisting particles comprise 0.5 to 5 percent by weight yttrium oxide, 0.5 to 5 percent by weight molybdenum oxide, 0.5 to 25 percent by weight zinc oxide, 0.5 to 5 percent by weight cerium oxide and 60 to 98 percent by weight silica, wherein the percents by weight are based on the total weight of the particles. In certain embodiments, such particles are substantially free, or, in some cases, completely free of zirconium.

Certain embodiments of the coating compositions of the present invention comprise ultrafine corrosion resisting particles comprising an inorganic oxide, or in some embodiments, a plurality of inorganic oxides. As used herein, the term "ultrafine" refers to particles that have a B.E.T. specific surface area of at least 10 square meters per gram, such as 30 to 500 square meters per gram, or, in some cases, 80 to 250 square meters per gram. As used herein, the term "B.E.T. specific surface area" refers to a specific surface area determined by nitrogen adsorption according to the ASTM D 3663-78 standard based on the Brunauer-Emmett-Teller method described in the periodical "The Journal of the American Chemical Society", 60, 309 (1938).

In certain embodiments, the coating compositions of the present invention comprise corrosion resisting particles having a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter(nanometers)}=6000/[\text{BET}(m^2/g)*\rho(\text{grams}/cm^3)]$$

Certain embodiments of the coating compositions of the present invention comprise corrosion resisting particles having an average primary particle size of no more than 100 nanometers, such as no more than 50 nanometers, or, in certain embodiments, no more than 20 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification and the Examples contained herein illustrate a suitable method for preparing a TEM image. The primary particle size of a particle refers to the smallest diameter sphere that will completely enclose the particle. As used herein, the term "primary particle size" refers to the size of an individual particle as opposed to an agglomeration of two or more individual particles.

In certain embodiments, the corrosion resisting particles have an affinity for the medium of the composition sufficient to keep the particles suspended therein. In these embodiments, the affinity of the particles for the medium is greater than the affinity of the particles for each other, thereby reducing or eliminating agglomeration of the particles within the medium.

The shape (or morphology) of the corrosion resisting particles can vary. For example, generally spherical morphologies can be used, as well as particles that are cubic, platy, or acicular (elongated or fibrous).

The ultrafine corrosion resisting particles that are included in certain embodiments of the coating compositions of the present invention may be prepared by various methods, including gas phase synthesis processes, such as, for example, flame pyrolysis, hot walled reactor, chemical vapor synthesis, among other methods. In certain embodiments, however, such particles are prepared by reacting together one or more organometallic and/or metal oxide precursors in a fast quench plasma system. In certain embodiments, the particles may be formed in such a system by: (a) introducing materials into a plasma chamber; (b) rapidly heating the materials by means of a plasma to yield a gaseous product stream; (c) passing the gaseous product stream through a restrictive convergent-divergent nozzle to effect rapid cooling and/or utilizing an alternative cooling method, such as a cool surface or quenching stream, and (d) condensing the gaseous product stream to yield ultrafine solid particles. Certain suitable fast quench plasma systems and methods for their use are described in U.S. Pat. Nos. 5,749,937, 5,935,293, and RE37, 853 E, which are incorporated herein by reference. One particular process of preparing ultrafine corrosion resisting particles suitable for use in certain embodiments of the coating compositions of the present invention comprises: (a) introducing one or more organometallic precursors and/or inorganic oxide precursors into one axial end of a plasma chamber; (b) rapidly heating the precursor stream by means of a plasma as the precursor stream flows through the plasma chamber, yielding a gaseous product stream; (c) passing the gaseous product stream through a restrictive convergent-divergent nozzle arranged coaxially within the end of the reaction chamber; and (d) subsequently cooling and slowing the velocity of the desired end product exiting from the nozzle, yielding ultrafine solid particles.

The precursor stream may be introduced to the plasma chamber as a solid, liquid, gas, or a mixture thereof. Suitable liquid precursors that may be used as part of the precursor stream include organometallics, such as, for example, cerium-2 ethylhexanoate, zinc-2 ethylhexanoate, tetraethoxysilane, calcium methoxide, triethylphosphate, lithium 2,4 pentanedionate, yttrium butoxide, molybdenum oxide bis(2, 4-pentanedionate), trimethoxyboroxine, aluminum sec-butoxide, among other materials, including mixtures thereof. Suitable solid precursors that may be used as part of the precursor stream include solid silica powder (such as silica fume, fumed silica, silica sand, and/or precipitated silica), cerium acetate, cerium oxide, magnesium oxide, tin oxide, zinc oxide, and other oxides, among other materials, including mixtures thereof.

In certain embodiments, the ultrafine corrosion resisting particles that are included in certain embodiments of the coating compositions of the present invention are prepared by a method comprising: (a) introducing a solid precursor into a plasma chamber; (b) heating the precursor by means of a plasma to a selected reaction temperature as the precursor flows through the plasma chamber, yielding a gaseous product stream; (c) contacting the gaseous product stream with a plurality of quench streams injected into the plasma chamber through a plurality of quench gas injection ports, wherein the quench streams are injected at flow rates and injection angles that result in the impingement of the quench streams with each other within the gaseous product stream, thereby producing ultrafine solid particles; and (d) passing the ultrafine solid particles through a converging member.

Referring now to FIG. 1, there is seen a flow diagram depicting certain embodiments of the methods for making ultrafine corrosion resisting particles in accordance with the present invention. As is apparent, in certain embodiments, at step 100, a solid precursor is introduced into a feed chamber. Then, as is apparent from FIG. 1 at step 200, in certain embodiments, the solid precursor is contacted with a carrier. The carrier may be a gas that acts to suspend the solid precursor in the gas, thereby producing a gas-stream suspension of the solid precursor. Suitable carrier gasses include, but are not limited to, argon, helium, nitrogen, oxygen, air, hydrogen, or a combination thereof.

Next, in certain embodiments, the solid precursor is heated, at step 300, by means of a plasma as the solid precursor flows through the plasma chamber, yielding a gaseous product stream. In certain embodiments, the precursor is heated to a temperature ranging from 2,500° to 20,000° C., such as 1,700° to 8,000° C.

In certain embodiments, the gaseous product stream may be contacted with a reactant, such as a hydrogen-containing material, that may be injected into the plasma chamber, as indicated at step 350. The particular material used as the reactant is not limited and may include, for example, air, water vapor, hydrogen gas, ammonia, and/or hydrocarbons, depending on the desired properties of the resulting ultrafine solid particles.

As is apparent from FIG. 1, in certain embodiments, after the gaseous product stream is produced, it is, at step 400, contacted with a plurality of quench streams that are injected into the plasma chamber through a plurality of quench stream injection ports, wherein the quench streams are injected at flow rates and injection angles that result in impingement of the quench streams with each other within the gaseous product stream. The material used in the quench streams is not limited, so long as it adequately cools the gaseous product stream to cause formation of ultrafine solid particles. Materials suitable for use in the quench streams include, but are not limited to, hydrogen gas, carbon dioxide, air, water vapor, ammonia, mono, di and polybasic alcohols, silicon-containing materials (such as hexamethyldisilazane), carboxylic acids and/or hydrocarbons.

The particular flow rates and injection angles of the various quench streams are not limited, so long as they impinge with each other within the gaseous product stream to result in the rapid cooling of the gaseous product stream to produce ultrafine solid particles. This differentiates the present invention from certain fast quench plasma systems that utilize Joule-Thompson adiabatic and isoentropic expansion through, for example, the use of a converging-diverging nozzle or a "virtual" converging diverging nozzle, to form ultrafine particles. In the present invention, the gaseous product stream is contacted with the quench streams to produce ultrafine solid particles before passing those particles through a converging member, such as, for example, a converging-diverging nozzle, which the inventors have surprisingly discovered aids in, inter alia, reducing the fouling or clogging of the plasma chamber, thereby enabling the production of ultrafine solid particles from solid reactants without frequent disruptions in the production process for cleaning of the plasma system. In the present invention, the quench streams primarily cool the gaseous product stream through dilution, rather than adiabatic expansion, thereby causing a rapid quenching of the gaseous product stream and the formation of ultrafine solid particles prior to passing the particles into and through a converging member, such as a converging-diverging nozzle, as described below.

Referring again to FIG. 1, it is seen that, after contacting the gaseous product stream with the quench streams to cause production of ultrafine solid particles, the particles are, at step 500, passed through a converging member, wherein the plasma system is designed to minimize the fouling thereof. In certain embodiments, the converging member comprises a converging-diverging (De Laval) nozzle. In these embodiments, while the convergent-divergent nozzle may act to cool the product stream to some degree, the quench streams perform much of the cooling so that a substantial amount of ultrafine solid particles are formed upstream of the convergent-divergent nozzle. In these embodiments, the convergent-divergent nozzle may primarily act as a choke position that permits operation of the plasma chamber at higher pressures, thereby increasing the residence time of the materials therein. The combination of quench stream dilution cooling with a convergent-divergent nozzle appears to provide a commercially viable method of producing ultrafine solid particles from solid precursors, since, for example, (i) a solid precursor can be used effectively without heating the feed material to a gaseous or liquid state before injection into the plasma, and (ii) fouling of the plasma system can be minimized, or eliminated, thereby reducing or eliminating disruptions in the production process for cleaning of the plasma system.

As is seen in FIG. 1, in certain embodiments of the methods of the present invention, after the ultrafine solid particles are passed through a converging member, they are harvested at step 600. Any suitable means may be used to separate the ultrafine solid particles from the gas flow, such as, for example, a bag filter or cyclone separator.

Figure 2:
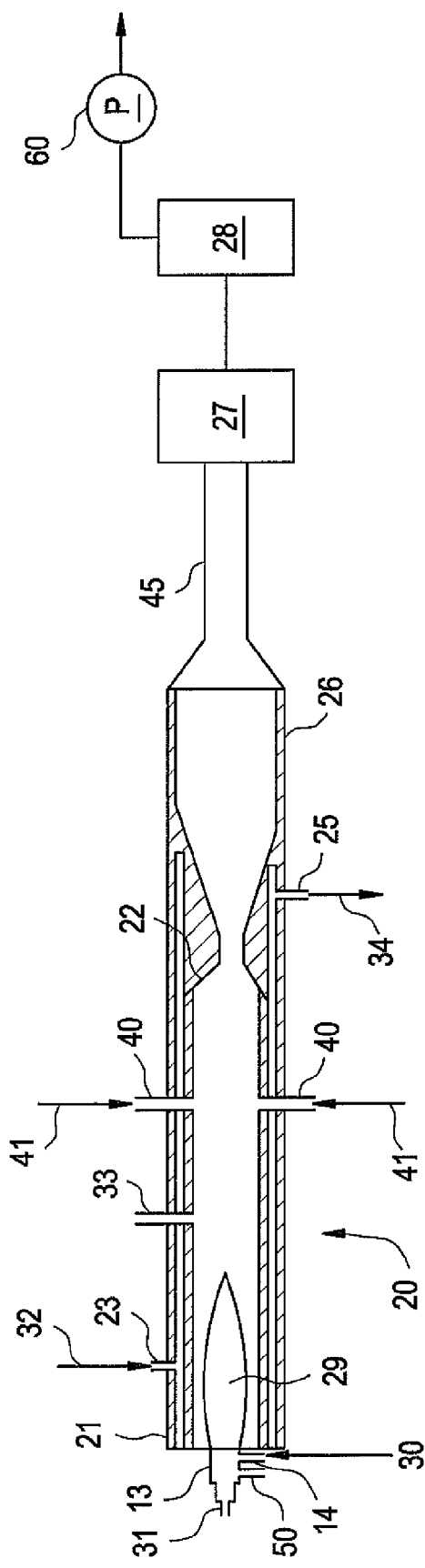
FIG. 2 is a schematic view of an apparatus for producing ultrafine solid particles in accordance with certain embodiments of the present invention.

Now referring to FIG. 2, there is depicted a schematic diagram of an apparatus for producing ultrafine solid particles in accordance with certain embodiments of the present invention. As is apparent, a plasma chamber 20 is provided that includes a solid particle feed inlet 50. Also provided is at least one carrier gas feed inlet 14, through which a carrier gas flows in the direction of arrow 30 into the plasma chamber 20. As previously indicated, the carrier gas acts to suspend the solid reactant in the gas, thereby producing a gas-stream suspension of the solid reactant which flows towards plasma 29. Numerals 23 and 25 designate cooling inlet and outlet respectively, which may be present for a double-walled plasma chamber 20. In these embodiments, coolant flow is indicated by arrows 32 and 34.

In the embodiment depicted by FIG. 2, a plasma torch 21 is provided. Torch 21 vaporizes the incoming gas-stream suspension of solid reactant within the resulting plasma 29 as the stream is delivered through the inlet of the plasma chamber 20, thereby producing a gaseous product stream. As is seen in FIG. 2, the solid particles are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas to very high temperatures within microseconds of passing through the arc. The plasma is often luminous at temperatures above 9000 K.

A plasma can be produced with any of a variety of gases. This can give excellent control over any chemical reactions taking place in the plasma as the gas may be inert, such as argon, helium, or neon, reductive, such as hydrogen, methane, ammonia, and carbon monoxide, or oxidative, such as oxygen, nitrogen, and carbon dioxide. Air, oxygen, and/or oxygen/argon gas mixtures are often used to produce ultrafine solid particles in accordance with the present invention. In FIG. 2, the plasma gas feed inlet is depicted at 31.

As the gaseous product stream exits the plasma 29 it proceeds towards the outlet of the plasma chamber 20. As is apparent, an additional reactant, as described earlier, can be injected into the reaction chamber prior to the injection of the quench streams. A supply inlet for the reactant is shown in FIG. 2 at 33.

As is seen in FIG. 2, in certain embodiments of the present invention, the gaseous product stream is contacted with a plurality of quench streams which enter the plasma chamber 20 in the direction of arrows 41 through a plurality of quench gas injection ports 40 located along the circumference of the plasma chamber 20. As previously indicated, the particular flow rate and injection angle of the quench streams is not limited so long as they result in impingement of the quench streams 41 with each other within the gaseous reaction product stream, in some cases at or near the center of the gaseous product stream, to result in the rapid cooling of the gaseous product stream to produce ultrafine solid particles. This results in a quenching of the gaseous product stream through dilution to form ultrafine solid particles.

Figure 3:
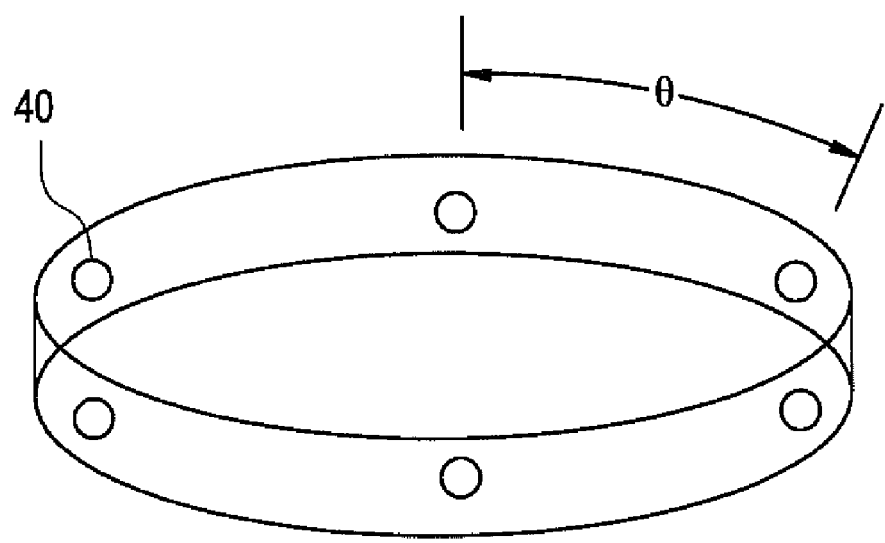
FIG. 3 is a detailed perspective view of a plurality of quench stream injection ports in accordance with certain embodiments of the present invention.

Referring now to FIG. 3, there is depicted a perspective view of a plurality of quench gas injection ports 40 in accordance with certain embodiments of the present invention. In this particular embodiment, six (6) quench gas injection ports are depicted, wherein each port disposed at an angle "θ" apart from each other along the circumference of the reactor chamber 20. It will be appreciated that "θ" may have the same or a different value from port to port. In certain embodiments of the present invention, at least four (4) quench stream injection ports 40 are provided, in some cases at least six (6) quench stream injection ports are present or, in other embodiments, twelve (12) or more quench stream injection ports are present. In certain embodiments, each angle "θ" has a value of no more than 90°. In certain embodiments, the quench streams are injected into the plasma chamber normal (90° angle) to the flow of the gaseous reaction product. In some cases, however, positive or negative deviations from the 90° angle by as much as 30° may be used.

In certain methods of the present invention, contacting the gaseous product stream with the quench streams results in the formation of ultrafine solid particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

In certain embodiments, the converging member comprises a convergent-divergent (De Laval) nozzle, such as that which is depicted in FIG. 2, which is positioned within the outlet of the reactor chamber 20. The converging or upstream section of the nozzle, i.e., the converging member, restricts gas passage and controls the residence time of the materials within the plasma chamber 20. It is believed that the contraction that occurs in the cross sectional size of the gaseous stream as it passes through the converging portion of nozzle 22 changes the motion of at least some of the flow from random directions, including rotational and vibrational motions, to a straight line motion parallel to the reaction chamber axis. In certain embodiments, the dimensions of the plasma chamber 20 and the material are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 is maintained at a vacuum pressure by operation of a vacuum producing device, such as a vacuum pump 60. Following passage through nozzle 22, the ultrafine solid particles may then enter a cool down chamber 26.

As is apparent from FIG. 2, in certain embodiments of the present invention, the ultrafine solid particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The solid precursor may be injected under pressure (such as greater than 1 to 100 atmospheres) through a small orifice to achieve sufficient velocity to penetrate and mix with the plasma. In addition, in many cases the injected stream of solid precursor is injected normal (90° angle) to the flow of the plasma gases. In some cases, positive or negative deviations from the 90° angle by as much as 30° may be desired.

The high temperature of the plasma rapidly vaporizes the solid precursor. There can be a substantial difference in temperature gradients and gaseous flow patterns along the length of the plasma chamber 20. It is believed that, at the plasma arc inlet, flow is turbulent and there is a high temperature gradient; from temperatures of about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection, and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that precursors have sufficient residence time at the high temperature to reach an equilibrium state and complete the formation of the desired end products.

The inside diameter of the plasma chamber 20 may be determined by the fluid properties of the plasma and moving gaseous stream. It should be sufficiently great to permit necessary gaseous flow, but not so large that recirculating eddys or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45° degree.) leading into the nozzle throat. The purpose of the nozzle throat is often to compress the gases and achieve sonic velocities in the flow. The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE37,853 at col. 9, line 65 to col. 11, line 32, the cited portion of which being incorporated by reference herein.

It has been surprisingly discovered that the methods and apparatus for making ultrafine solid particles of the present invention, which utilize quench gas dilution cooling in combination with a converging member, such as a converging-diverging nozzle, has several benefits. First, such a combination allows for the use of sufficient residence times of solid material within the plasma system that make the use of solid precursors practical. Second, because ultrafine solid particles are formed prior to the flow reaching the converging member, fouling of the plasma chamber is reduced or, in some cases, even eliminated, since the amount of material sticking to the interior surface of the converging member is reduced or, in some cases, eliminated. Third, this combination allows for the collection of ultrafine solid particles at a single collection point, such as a filter bag, with a minimal amount of such particles being deposited within the cooling chamber or cooling section described earlier.

In certain embodiments of the coating compositions of the present invention, the corrosion resisting particles comprise an inorganic oxide network comprising one or more inorganic materials. As used herein, the term "inorganic oxide network comprising one or more inorganic materials" refers to a molecular chain comprising one, or, in some cases, two or more different inorganic materials chemically connected to each other through one or more oxygen atoms. Such a network may be formed from hydrolysis of metal salts, examples of which include, but are not limited to, $Ce^{3+}$, $Ce^{4+}$, $Zn^{2+}$, $Mg^{2+}$, $Y^{3+}$, $Ca^{2+}$, $Mn^{7+}$, and $Mo^{6+}$. In certain embodiments, the inorganic oxide network comprises zinc, cerium, yttrium, manganese, magnesium, or calcium. In certain embodiments, the inorganic oxide network also comprises silicon, phosphorous, and/or boron. In certain embodiments, the inorganic oxide network comprises cerium, zinc, zirconium, and/or manganese, as well as silicon. In certain embodiments, the inorganic oxide network comprises 0.5 to 30 percent by weight cerium and 0.5 to 20 percent by weight zinc, with the weight percents being based on the total weight of the material.

In certain embodiments, the inorganic oxide network comprises silicon resulting from the hydrolysis of an organosilane, such as silanes comprising two, three, four, or more alkoxy groups. Specific examples of suitable organosilanes include methyltrimethoxysilane, methyltriethoxysilane, methyltrimethoxysilane, methyltriacetoxysilane, methyltripropoxysilane, methyltributoxysilane, ethyltrimethoxysilane, ethyltriethoxysilane, γ-meth-acryloxypropyltrimethoxysilane, γ-aminopropyltrimethoxysilane, γ-aminopropyltriethoxysilane, γ-mercaptopropyltrimethoxysilane, chloromethyltrimethoxysilane, chloromethylriethoxysilane, dimethyldiethoxysilane, γ-chloropropylmethyldimethoxysilane, γ-chloropropylmethyldiethoxysilane, tetramethoxysilane, tetraethoxysilane, tetra-n-propoxysilane, tetra-n-butoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropylmethyldimethoxysilane, γ-glycidoxy-propyldimethylethoxysilane, hydrolyzates thereof, oligomers thereof and mixtures of such silane monomers. In certain embodiments, the inorganic oxide network comprises silicon resulting from a silicate, such as potassium silicate, sodium silicate, and/or ammonium silicate.

In certain embodiments, the inorganic oxide network is formed by combining one, or in some cases, two or more metal salts, such as metal acetates, chlorides, sulfates, and/or nitrates, with water to produce a hydrolyzed species comprising a polyvalent metal ion. The hydrolyzed species is then reacted with a suitable silicon compound (or phosphorous or boron as the case may be) to produce an inorganic oxide network comprising one or more inorganic materials. The resulting solid material may then be filtered, washed, and dried. The resulting dried powder may, if desired, be calcined at a temperature of, for example, 200 to 1,000° F. The Examples herein illustrate suitable methods for making such corrosion resisting particles.

In certain embodiments, the corrosion resisting particles comprising an inorganic oxide network, as described above, are ultrafine particles.

In certain embodiments of the coating compositions of the present invention, the corrosion resisting particles comprise a clay. In certain embodiments, such clays are treated with a lanthamide and/or transition metal salt. Suitable clays include, for example, layer structured Laponite® (a hydrous sodium lithium magnesium silicate modified with tetra sodium pyrophosphate commercially available from Southern Clay Products, Inc.) and bentonite (an aluminum phyllosilicate generally impure clay consisting mostly of montmorillonite, $(Na,Ca)_{0.33}(Al,Mg)_2Si_4O_{10}(OH)_2 \cdot nH_2O$).

Such corrosion resisting particles may be produced by adding a clay, such as the layer structured Laponite® referenced above, to a stirred dilute solution of a metal salt (up to 50% by weight metal), such as, for example, cerium acetate or zinc acetate, in water and filtering off the resulting solid precipitate. The solid precipitate may, if desired, be washed, such as with water and/or acetone, and dried.

In certain embodiments, the present invention is directed to coating compositions that comprise corrosion resisting particles comprising an inorganic oxide in combination with a pH buffering agent, such as, for example, a borate. As used herein, the term "pH buffering agent" is meant to refer to a material that adjusts the pH of the inorganic oxide to a level higher than the pH would be in the absence of the material. In certain embodiments, such corrosion resisting particles comprise a mixed metal oxide that includes borate ($B_2O_3$), and one or more oxides of zinc, barium, cerium, yttrium, magnesium, molybdenum, lithium, aluminum, or calcium. In certain embodiments, such a mixed oxide is deposited on and/or within a support.

As used herein, the term "support" refers to a material upon which or in which another material is carried. In certain embodiments, the corrosion resisting particles comprise an inorganic oxide, a borate, and a silica support, such as fumed silica, commercially available under the tradename Aerosil® from Degussa, or precipitated silica, such as Hi-Sil® T600 from PPG Industries, Pittsburgh, Pa. In certain embodiments, the support has an average primary particle size of no more than 20 nanometers. In certain embodiments, such corrosion resisting particles provide desirable protection against both edge corrosion and scribe-corrosion on the surface of a substrate that is exposed to anodic dissolution.

Specific non-limiting examples of suitable corrosion resisting particles comprising a mixed metal oxide including borate comprise $CaO \cdot B_2O_3$, $BaO \cdot B_2O_3$, $ZnO \cdot B_2O_3$, and/or $MgO \cdot B_2O_3$. Such corrosion resisting pigments can be produced, for example, by precipitating the such materials on the support. Such precipitation may be conducted by, for example, combining boric acid and one or more precursor materials comprising zinc, barium, cerium, yttrium, magnesium, molybdenum, lithium, aluminum, or calcium, with a slurry of water and silica, evaporating the water, and then calcining the resulting material to produce the corrosion resisting particles, which may then be milled to a desired particle size.

In certain embodiments, such particles may also comprise additional materials, such as phosphates, silicates, hydroxyphosphates, and/or hydroxy-silicates of a metal, such as zinc or aluminum.

In certain embodiments, one or more of the previously described corrosion resisting particles are present in the coating compositions of the present invention in an amount of 3 to 50 percent by volume, such as 8 to 30 percent by volume, or, in certain embodiments, 10 to 18 percent by volume, wherein the volume percents are based on the total volume of the coating composition.

In certain embodiments, the coating compositions of the present invention comprise corrosion resisting particles comprising chemically modified particles having an average primary particle size of no more than 500 nanometers, in some cases, no more than 200 nanometers, and, in yet other cases, no more than 100 nanometers. Examples of such particles are described in U.S. Pat. No. 6,790,904 at col. 3, line 43 to col. 8, line 46; United States Patent Application Publication No. 2003/0229157 A1 at to [0048]; U.S. Pat. No. 6,835,458 at col. 4, line 54 to col. 7, line 58; and U.S. Pat. No. 6,593,417 at col. 23, line 48 to col. 24, line 32, the cited portions of which being incorporated by reference herein. Suitable chemically modified particles are also commercially available, such as those available under the tradename NANOBYK-3650, from Byk-Chemie.

While such chemically modified particles are known in the art for providing mar and/or scratch resistance properties to coating compositions into which they are incorporated, the present inventors have surprisingly discovered that they also impart corrosion resistance properties to metal substrate primer compositions, such as etch-primers, and/or pretreatment coating compositions when such compositions are applied to a bare metal substrate. In fact, the inventors have discovered that, even when such chemically-modified particles are included in a coating composition in relatively small amounts, i.e., particle to film-forming binder weight ratios of less than 0.2, the coating composition, when deposited onto at least a portion of a bare metal substrate selected from cold rolled steel, electrogalvanized steel and aluminum and cured, sometimes produces a substrate that exhibits corrosion resistance properties similar to, or, in some cases, greater than, the corrosion resistance properties the same substrate exhibits when at least partially coated under the same conditions with a conventional chrome-containing corrosion-resistant composition (as described in more detail below). As a result, the inventors have discovered that such corrosion resisting particles can be used to replace chromium in metal substrate primer coating compositions, such as etch-primers, and/or metal pretreatment coating compositions.

As previously indicated, in certain embodiments, the coating compositions of the present invention comprise a film-forming resin. As used herein, the term "film-forming resin" refers to resins that can form a self-supporting continuous film on at least a horizontal surface of a substrate upon removal of any diluents or carriers present in the composition or upon curing at ambient or elevated temperature.

Film-forming resins that may be used in the coating compositions of the present invention include, without limitation, those used in automotive OEM coating compositions, automotive refinish coating compositions, industrial coating compositions, architectural coating compositions, coil coating compositions, and aerospace coating compositions, among others.

In certain embodiments, the film-forming resin included within the coating compositions of the present invention comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions of the present invention comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

Film-forming resins suitable for use in the coating compositions of the present invention include, for example, those formed from the reaction of a polymer having at least one type of reactive group and a curing agent having reactive groups reactive with the reactive group(s) of the polymer. As used herein, the term "polymer" is meant to encompass oligomers, and includes, without limitation, both homopolymers and copolymers. The polymers can be, for example, acrylic, saturated or unsaturated polyester, polyurethane or polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof.

Suitable acrylic polymers include, for example, those described in United States Patent Application Publication 2003/0158316 A1 at [0030]-[0039], the cited portion of which being incorporated herein by reference. Suitable polyester polymers include, for example, those described in United States Patent Application Publication 2003/0158316 A1 at [0040]-[0046], the cited portion of which being incorporated herein by reference. Suitable polyurethane polymers include, for example, those described in United States Patent Application Publication 2003/0158316 A1 at [0047]-[0052], the cited portion of which being incorporated herein by reference. Suitable silicon-based polymers are defined in U.S. Pat. No. 6,623,791 at col. 9, lines 5-10, the cited portion of which being incorporated herein by reference.

In certain embodiments of the present invention, the film-forming resin comprises a polyvinyl polymer, such as a polyvinyl butyral resin. Such resins may be produced by reacting a polyvinyl alcohol with an aldehyde, such as acetaldehyde, formaldehyde, or butyraldehyde, among others. Polyvinyl alcohols may be produced by the polymerization of vinyl acetate monomer and the subsequent, alkaline-catalyzed methanolysis of the polyvinyl acetate obtained. The acetalization reaction of polyvinyl alcohol and butyraldehyde is not quantitative, so the resulting polyvinyl butyral may contain a certain amount of hydroxyl groups. In addition, a small amount of acetyl groups may remain in the polymer chain.

Commercially available polyvinyl butyral resins may be used. Such resins often have an average degree of polymerization of 500 to 1000 and a degree of buyration of 57 to 70 mole percent. Specific examples of suitable polyvinyl butyral resins include the MOWITAL® line of polyvinyl butyral resins commercially available from Kuraray America, Inc., New York, N.Y. and the BUTVAR® polyvinyl butyral resins commercially available from Solutia Inc.

As indicated earlier, certain coating compositions of the present invention can include a film-forming resin that is formed from the use of a curing agent. As used herein, the term "curing agent" refers to a material that promotes "cure" of composition components. As used herein, the term "cure" means that any crosslinkable components of the composition are at least partially crosslinked. In certain embodiments, the crosslink density of the crosslinkable components, i.e., the degree of crosslinking, ranges from 5 percent to 100 percent of complete crosslinking, such as 35 percent to 85 percent of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer, as is described in U.S. Pat. No. 6,803,408, at col. 7, line 66 to col. 8, line 18, the cited portion of which being incorporated herein by reference.

Any of a variety of curing agents known to those skilled in the art may be used. For example exemplary suitable aminoplast and phenoplast resins are described in U.S. Pat. No. 3,919,351 at col. 5, line 22 to col. 6, line 25, the cited portion of which being incorporated herein by reference. Exemplary suitable polyisocyanates and blocked isocyanates are described in U.S. Pat. No. 4,546,045 at col. 5, lines 16 to 38; and in U.S. Pat. No. 5,468,802 at col. 3, lines 48 to 60, the cited portions of which being incorporated herein by reference. Exemplary suitable anhydrides are described in U.S. Pat. No. 4,798,746 at col. 10, lines 16 to 50; and in U.S. Pat. No. 4,732,790 at col. 3, lines 41 to 57, the cited portions of which being incorporated herein by reference. Exemplary suitable polyepoxides are described in U.S. Pat. No. 4,681, 811 at col. 5, lines 33 to 58, the cited portion of which being incorporated herein by reference. Exemplary suitable polyacids are described in U.S. Pat. No. 4,681,811 at col. 6, line 45 to col. 9, line 54, the cited portion of which being incorporated herein by reference. Exemplary suitable polyols are described in U.S. Pat. No. 4,046,729 at col. 7, line 52 to col. 8, line 9 and col. 8, line 29 to col. 9, line 66, and in U.S. Pat. No. 3,919,315 at col. 2, line 64 to col. 3, line 33, the cited portions of which being incorporated herein by reference. Examples suitable polyamines described in U.S. Pat. No. 4,046,729 at col. 6, line 61 to col. 7, line 26, and in U.S. Pat. No. 3,799,854 at column 3, lines 13 to 50, the cited portions of which being incorporated herein by reference. Appropriate mixtures of curing agents, such as those described above, may be used.

In certain embodiments, the coating compositions of the present invention are formulated as a one-component composition where a curing agent is admixed with other composition components to form a storage stable composition. In other embodiments, compositions of the present invention can be formulated as a two-component composition where a curing agent is added to a pre-formed admixture of the other composition components just prior to application.

In certain embodiments, the film-forming resin is present in the coating compositions of the present invention in an amount greater than 30 weight percent, such as 40 to 90 weight percent, or, in some cases, 50 to 90 weight percent, with weight percent being based on the total weight of the coating composition. When a curing agent is used, it may, in certain embodiments, be present in an amount of up to 70 weight percent, such as 10 to 70 weight percent; this weight percent is also based on the total weight of the coating composition.

In certain embodiments, the coating compositions of the present invention are in the form of liquid coating compositions, examples of which include aqueous and solvent-based coating compositions and electrodepositable coating compositions. The coating compositions of the present invention may also be in the form of a co-reactable solid in particulate form, i.e., a powder coating composition. Regardless of the form, the coating compositions of the present invention may be pigmented or clear, and may be used alone or in combination as primers, basecoats, or topcoats. Certain embodiments of the present invention, as discussion in more detail below, are directed to corrosion resistant primer and/or pretreatment coating compositions. As indicated, certain embodiments of the present invention are directed to metal substrate primer coating compositions, such as "etch primers," and/or metal substrate pretreatment coating compositions. As used herein, the term "primer coating composition" refers to coating compositions from which an undercoating may be deposited onto a substrate in order to prepare the surface for application of a protective or decorative coating system. As used herein, the term "etch primer" refers to primer coating compositions that include an adhesion promoting component, such as a free acid as described in more detail below. As used herein, the term "pretreatment coating composition" refers to coating compositions that can be applied at very low film thickness to a bare substrate to improve corrosion resistance or to increase adhesion of subsequently applied coating layers. Metal substrates that may be coated with such compositions include, for example, substrates comprising steel (including electrogalvanized steel, cold rolled steel, hot-dipped galvanized steel, among others), aluminum, aluminum alloys, zinc-aluminum alloys, and aluminum plated steel. Substrates that may be coated with such compositions also may comprise more than one metal or metal alloy, in that the substrate may be a combination of two or more metal substrates assembled together, such as hot-dipped galvanized steel assembled with aluminum substrates.

The metal substrate primer coating compositions and/or metal substrate pretreatment coating compositions of the present invention may be applied to bare metal. By "bare" is meant a virgin material that has not been treated with any pretreatment compositions, such as, for example, conventional phosphating baths, heavy metal rinses, etc. Additionally, bare metal substrates being coated with the primer coating compositions and/or pretreatment coating compositions of the present invention may be a cut edge of a substrate that is otherwise treated and/or coated over the rest of its surface.

Before applying a primer coating composition of the present invention and/or a metal pretreatment composition of the present invention, the metal substrate to be coated may first be cleaned to remove grease, dirt, or other extraneous matter. Conventional cleaning procedures and materials may be employed. These materials could include, for example, mild or strong alkaline cleaners, such as those that are commercially available. Examples include BASE Phase Non-Phos or BASE Phase #6, both of which are available from PPG Industries, Pretreatment and Specialty Products. The application of such cleaners may be followed and/or preceded by a water rinse.

The metal surface may then be rinsed with an aqueous acidic solution after cleaning with the alkaline cleaner and before contact with a metal substrate primer coating composition and/or metal substrate pretreatment composition of the present invention. Examples of suitable rinse solutions include mild or strong acidic cleaners, such as the dilute nitric acid solutions commercially available.

As previously indicated, certain embodiments of the present invention are directed to coating compositions comprising an adhesion promoting component. As used herein, the term "adhesion promoting component" refers to any material that is included in the composition to enhance the adhesion of the coating composition to a metal substrate.

In certain embodiments of the present invention, such an adhesion promoting component comprises a free acid. As used herein, the term "free acid" is meant to encompass organic and/or inorganic acids that are included as a separate component of the compositions of the present invention as opposed to any acids that may be used to form a polymer that may be present in the composition. In certain embodiments, the free acid included within the coating compositions of the present invention is selected from tannic acid, gallic acid, phosphoric acid, phosphorous acid, citric acid, malonic acid, a derivative thereof, or a mixture thereof. Suitable derivatives include esters, amides, and/or metal complexes of such acids.

In certain embodiments, the free acid comprises an organic acid, such as tannic acid, i.e., tannin. Tannins are extracted from various plants and trees which can be classified according to their chemical properties as (a) hydrolyzable tannins, (b) condensed tannins, and (c) mixed tannins containing both hydrolyzable and condensed tannins. Tannins useful in the present invention include those that contain a tannin extract from naturally occurring plants and trees, and are normally referred to as vegetable tannins. Suitable vegetable tannins include the crude, ordinary or hot-water-soluble condensed vegetable tannins, such as Quebracho, mimosa, mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure.

In certain embodiments, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. Nos. 6,440,580 at col. 3, line 24 to col. 6, line 22, 5,294,265 at col. 1, line 53 to col. 2, line 55, and 5,306,526 at col. 2, line 15 to col. 3, line 8, the cited portions of which being incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790.

In certain embodiments, the adhesion promoting component comprises a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at col. 3, lines 19 to 62, the cited portion of which being incorporated by reference herein.

In certain embodiments, the adhesion promoting component is present in the metal substrate primer coating compositions and/or the metal pretreatment coating composition in an amount ranging from 0.05 to 20 percent by weight, such as 3 to 15 percent by weight, with the percents by weight being based on the total weight of the composition.

As previously indicated, in certain embodiments, such as embodiments where the coating compositions of the present invention comprise a metal substrate primer coating composition and/or a metal pretreatment composition, the composition may also comprise a film-forming resin. In certain embodiments, the film-forming resin is present in such compositions in an amount ranging from 20 to 90 percent by weight, such as 30 to 80 percent by weight, with the percents by weight being based on the total weight of the composition.

In certain embodiments, the coating compositions of the present invention may also comprise additional optional ingredients, such as those ingredients well known in the art of formulating surface coatings. Such optional ingredients may comprise, for example, pigments, dyes, surface active agents, flow control agents, thixotropic agents, fillers, anti-gassing agents, organic co-solvents, catalysts, antioxidants, light stabilizers, UV absorbers and other customary auxiliaries. Any such additives known in the art can be used, absent compatibility problems. Non-limiting examples of these materials and suitable amounts include those described in U.S. Pat. Nos. 4,220,679; 4,403,003; 4,147,769; and 5,071,904.

In certain embodiments, the coating compositions of the present invention also comprise, in addition to any of the previously described corrosion resisting particles, conventional non-chrome corrosion resisting particles. Suitable conventional non-chrome corrosion resisting particles include, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX® AC3 and/or SHIELDEX® C303. Suitable amorphous silica is available from W. R. Grace & Co. under the tradename SYLOID®. Suitable zinc hydroxyl phosphate is commercially available from Elementis Specialties, Inc. under the tradename NALZIN® 2.

These conventional non-chrome corrosion resisting pigments typically comprise particles having a particle size of approximately one micron or larger. In certain embodiments, these particles are present in the coating compositions of the present invention in an amount ranging from 5 to 40 percent by weight, such as 10 to 25 percent by weight, with the percents by weight being based on the total solids weight of the composition.

In certain embodiments, the present invention is directed to coating compositions comprising an adhesion promoting component, a phenolic resin and an alkoxysilane, in addition to any of the previously described corrosion resisting particles. Suitable phenolic resins include those resins prepared by the condensation of a phenol or an alkyl substituted phenol with an aldehyde. Exemplary phenolic resins include those described in U.S. Pat. No. 6,774,168 at col. 2, lines 2 to 22, the cited portion of which being incorporated herein by reference. Suitable alkoxysilanes are described in U.S. Pat. No. 6,774,168 at col. 2, lines 23 to 65, incorporated herein by reference, and include, for example, acryloxyalkoxysilanes, such as γ-acryloxypropyltrimethoxysilane and methacrylatoalkoxysilane, such as γ-methacryloxypropyltrimethoxysilane. Such compositions may also include a solvent, rheological agent, and/or pigment, as described in U.S. Pat. No. 6,774,168 at col. 3, lines 28 to 41, the cited portion of which being incorporated by reference herein.

The inventors have discovered that the corrosion resisting particles disclosed herein are particularly suitable for use in etch-primers, such as automotive refinish etch-primers and metal coil coating primers. As a result, certain embodiments of the present invention are directed to etch-primers comprising: (a) a film-forming resin, such as a polyvinyl resin; (b) an adhesion promoting component, such as a free acid; and (c) corrosion resisting particles of the type described herein. As used herein, the term "refinish" refers to the act of redoing, restoring or repairing the surface or finish of an article.

The coating compositions of the present invention may be prepared by any of a variety of methods. For example, in certain embodiments, the previously described corrosion resisting particles are added at any time during the formulation of a coating composition comprising a film-forming resin, so long as they form a stable suspension in a film-forming resin. Coating compositions of the present invention can be prepared by first blending a film-forming resin, the previously described corrosion resisting particles, and a diluent, such as an organic solvent and/or water, in a closed container that contains ceramic grind media. The blend is subjected to high shear stress conditions, such as by shaking the blend on a high speed shaker, until a homogeneous dispersion of particles remains suspended in the film-forming resin with no visible particle settle in the container. If desired, any mode of applying stress to the blend can be utilized, so long as sufficient stress is applied to achieve a stable dispersion of the particles in the film-forming resin.

The coating compositions of the present invention may be applied to a substrate by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used. While the coating compositions of the present invention can be applied to various substrates, such as wood, glass, cloth, plastic, foam, including elastomeric substrates and the like, in many cases, the substrate comprises a metal.

In certain embodiments of the coating compositions of the present invention, after application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 80 to 250° F. (20 to 121° C.) will be sufficient. More than one coating layer may be applied if desired. Usually between coats, the previously applied coat is flashed; that is, exposed to ambient conditions for 5 to 30 minutes. In certain embodiments, the thickness of the coating is from 0.05 to 5 mils (1.3 to 127 microns), such as 0.05 to 3.0 mils (1.3 to 76.2 microns). The coating composition may then be heated. In the curing operation, solvents are driven off and crosslinkable components of the composition, if any, are crosslinked. The heating and curing operation is sometimes carried out at a temperature in the range of from 160 to 350° F. (71 to 177° C.) but, if needed, lower or higher temperatures may be used.

As indicated, certain embodiments of the coating compositions of the present invention are directed to primer compositions, such as "etch primers," while other embodiments of the present invention are directed to metal substrate pretreatment compositions. In either case, such compositions are often topcoated with a protective and decorative coating system, such as a monocoat topcoat or a combination of a pigmented base coating composition and a clearcoat composition, i.e., a color-plus-clear system. As a result, the present invention is also directed to multi-component composite coatings comprising at least one coating layer deposited from a coating composition of the present invention. In certain embodiments, the multi-component composite coating compositions of the present invention comprise a base-coat film-forming composition serving as a basecoat (often a pigmented color coat) and a film-forming composition applied over the basecoat serving as a topcoat (often a transparent or clear coat).

In these embodiments of the present invention, the coating composition from which the basecoat and/or topcoat is deposited may comprise, for example, any of the conventional basecoat or topcoat coating compositions known to those skilled in the art of, for example, formulating automotive OEM coating compositions, automotive refinish coating compositions, industrial coating compositions, architectural coating compositions, coil coating compositions, and aerospace coating compositions, among others. Such compositions typically include a film-forming resin that may include, for example, an acrylic polymer, a polyester, and/or a polyurethane. Exemplary film-forming resins are disclosed in U.S. Pat. No. 4,220,679, at col. 2 line 24 to col. 4, line 40; as well as U.S. Pat. No. 4,403,003, U.S. Pat. No. 4,147,679 and U.S. Pat. No. 5,071,904.

The present invention is also directed to substrates, such as metal substrates, at least partially coated with a coating composition of the present invention as well as substrates, such as metal substrates, at least partially coated with a multi-component composite coating of the present invention.

In many cases, the coating compositions of the present invention, when deposited onto at least a portion of one metal substrate selected from cold rolled steel, electrogalvanized steel and aluminum and cured, produce a substrate that exhibits corrosion resistance properties greater than the corrosion resistance properties the same substrate exhibits when at least partially coated under the same conditions with a similar coating composition that does not include the previously described corrosion resisting particles. In some cases, the coating compositions of the present invention, when deposited onto at least a portion of two metal substrates selected from cold rolled steel, electrogalvanized steel and aluminum and cured, produce a substrate that exhibits corrosion resistance properties greater than the corrosion resistance properties the same two substrates exhibit when at least partially coated under the same conditions with a similar coating composition that does not include the previously described corrosion resisting particles. In some cases, the coating compositions of the present invention, when deposited onto at least a portion of a cold rolled steel, electrogalvanized steel and aluminum substrate and cured, produce a substrate that exhibits corrosion resistance properties greater than the corrosion resistance properties the same three substrates exhibit when at least partially coated under the same conditions with a similar coating composition that does not include the previously described corrosion resisting particles.

As a result, certain embodiments of the present invention are directed to coating compositions that comprise corrosion resisting particles selected from: (i) magnesium oxide particles having an average primary particle size of no more than 100 nanometers; (ii) particles comprising an inorganic oxide network comprising one or more inorganic oxide; and/or (iii) chemically modified particles having an average primary particle size of no more than 500 nanometers, and wherein the corrosion resisting particles are present in the composition in an amount sufficient to result in a composition that, when deposited onto at least a portion of one metal substrate selected from cold rolled steel, electrogalvanized steel and aluminum and cured, produces a substrate that exhibits corrosion resistance properties greater than the corrosion resistance properties the same substrate exhibits when at least partially coated under the same conditions with a similar coating composition that does not include the corrosion resisting particles.

In certain embodiments, the corrosion resisting particles are present in the composition in an amount sufficient to result in a composition that, when deposited onto at least a portion of two metal substrates selected from cold rolled steel, electrogalvanized steel and aluminum and cured, produces a substrate that exhibits corrosion resistance properties greater than the corrosion resistance properties the same two substrates exhibit when at least partially coated under the same conditions with a similar coating composition that does not include the corrosion resisting particles. In yet other embodiments, such particles are present in the composition in an amount sufficient to result in a composition that, when deposited onto at least a portion of a cold rolled steel, electrogalvanized steel and aluminum substrate and cured, produces a substrate that exhibits corrosion resistance properties greater than the corrosion resistance properties the same three substrates exhibit when at least partially coated under the same conditions with a similar coating composition that does not include the corrosion resisting particles.

As used herein, the term "corrosion resistance properties" refers to the measurement of corrosion prevention on a metal substrate utilizing the test described in ASTM B117 (Salt Spray Test). In this test, the coated substrate is scribed with a knife to expose the bare metal substrate. The scribed substrate is placed into a test chamber where an aqueous salt solution is continuously misted onto the substrate. The chamber is maintained at a constant temperature. The coated substrate is exposed to the salt spray environment for a specified period of time, such as 500 or 1000 hours. After exposure, the coated substrate is removed from the test chamber and evaluated for corrosion along the scribe. Corrosion is measured by "scribe creep", which is defined as the total distance the corrosion has traveled across the scribe measured in millimeters.

In this application, when it is stated that a substrate "exhibits corrosion resistance properties greater than" another substrate, it means that the substrate exhibits less scribe creep (the corrosion travels across the scribe fewer millimeters) compared to the other substrate. In certain embodiments, the corrosion resisting particles are present in the coating compositions of the present invention in an amount sufficient to result in a substrate exhibiting corrosion resistance properties at least 15% greater or, in some cases, at least 50% greater, than the corrosion resistance properties exhibited by the same substrate when at least partially coated under the same conditions with a similar coating composition that does not include the corrosion resisting particles.

As used herein, the term "the same conditions" means that a coating composition is (i) deposited on the substrate at the same or similar film thickness as the composition to which it is being compared, and (ii) cured under the same or similar cure conditions, such as cure temperature, humidity, and time, as the composition to which it is being compared. As used herein, the term "similar coating composition that does not include the corrosion resisting particles" means that a coating composition contains the same components in the same or similar amounts as the composition to which it is being compared, except that the corrosion resisting particles described herein, which are included in the coating compositions of the present invention, are not present and are replaced with conventional non-chrome corrosion resisting particles, such as NALZIN® 2 or SHIELDEX® AC3 (identified earlier).

In many cases, the coating compositions of the present invention, when deposited onto at least a portion of a metal substrate selected from cold rolled steel, electrogalvanized steel and aluminum and cured, produce a substrate that exhibits corrosion resistance properties similar to, or, in some cases, greater than, the corrosion resistance properties the same substrate exhibits when at least partially coated under the same conditions with a conventional chrome-containing corrosion-resistant composition. In some cases, the coating compositions of the present invention, when deposited onto at least a portion of two metal substrates selected from cold rolled steel, electrogalvanized steel and aluminum and cured, produce a substrate that exhibits corrosion resistance properties similar to, or, in some cases, greater than, the corrosion resistance properties the same two substrates exhibit when at least partially coated under the same conditions with a conventional chrome-containing corrosion-resistant composition. In some cases, the coating compositions of the present invention, when deposited onto at least a portion of a cold rolled steel, electrogalvanized steel and aluminum substrate and cured, produce a substrate that exhibits corrosion resistance properties similar to, or, in some cases, greater than, the corrosion resistance properties the same three substrates exhibit when at least partially coated under the same conditions with a conventional chrome-containing corrosion-resistant composition.

As a result, certain embodiments of the present invention are directed to coating compositions that comprise corrosion resisting particles selected from: (i) magnesium oxide particles having an average particle size of no more than 100 nanometers; (ii) particles comprising an inorganic oxide network comprising one or more inorganic oxide; and/or (iii) chemically modified particles having an average particle size of no more than 500 nanometers, and wherein the corrosion resisting particles are present in the composition in an amount sufficient to result in a composition that, when deposited onto at least a portion of one metal substrate selected from cold rolled steel, electrogalvanized steel and aluminum and cured, produces a substrate that exhibits corrosion resistance properties similar to or, in some embodiments, greater than, the corrosion resistance properties the same substrate exhibits when at least partially coated under the same conditions with a conventional chrome-containing corrosion-resistant composition. In certain embodiments, such corrosion resisting particles are present in the composition in an amount sufficient to result in a composition that, when deposited onto at least a portion of two metal substrates selected from cold rolled steel, electrogalvanized steel and aluminum and cured, produces a substrate that exhibits corrosion resistance properties similar to or, in some embodiments, greater than the corrosion resistance properties the same two substrates exhibit when at least partially coated under the same conditions with a conventional chrome-containing corrosion-resistant composition. In yet other embodiments, such corrosion resisting particles are present in the composition in an amount sufficient to result in a composition that, when deposited onto at least a portion of a cold rolled steel, electrogalvanized steel and aluminum substrate and cured, produces a substrate that exhibits corrosion resistance properties similar to, or, in some embodiments, greater than the corrosion resistance properties the same three substrates exhibit when at least partially coated under the same conditions with a conventional chrome-containing corrosion-resistant composition.

In this application, when it is stated that a substrate "exhibits corrosion resistance properties similar to" another substrate, it means that the substrate exhibits scribe creep as measured by ASTM B117 as described above no more than 10% greater than the substrate to which it is being compared. As used herein, the term "conventional chrome-containing corrosion-resistant composition" refers to coating compositions commercially available from PPG Industries, Inc., Pittsburgh, Pa., under the tradenames D8099 and DX1791.

As will be appreciated by those skilled in the art based on the foregoing description, certain embodiments of the present invention are directed to methods for enhancing the corrosion resistance of a metal substrate, such methods comprising coating at least a portion of the substrate with a primer and/or pretreatment coating composition that comprises (a) an adhesion promoting component, and (b) corrosion resisting particles selected from: (i) magnesium oxide particles having an average particle size of no more than 100 nanometers; (ii) particles comprising an inorganic oxide network comprising one or more inorganic oxide; and/or (iii) chemically modified particles having an average particle size of no more than 500 nanometers. In certain embodiments, such primer compositions are substantially free of chromium containing material and/or also comprise a film-forming resin, such as a polyvinyl polymer.

As will also be appreciated by the skilled artisan, certain embodiments of the present invention are directed to methods for enhancing the corrosion resistance of a metal substrate. The methods comprise coating at least a portion of the substrate with a primer and/or pretreatment coating composition that comprises (a) an adhesion promoting component, and (b) corrosion resisting particles selected from: (i) magnesium oxide particles having an average primary particle size of no more than 100 nanometers; (ii) particles comprising an inorganic oxide network comprising one or more inorganic oxide; and/or (iii) chemically modified particles having an average primary particle size of no more than 500 nanometers.

Illustrating the invention are the following examples, which, however, are not to be considered as limiting the invention to their details. Unless otherwise indicated, all parts and percentages in the following examples, as well as throughout the specification, are by weight.

EXAMPLES

The following Particle Examples describe the preparation of corrosion resisting particles suitable for use in certain embodiments of the coating compositions of the present invention.

Particle Example 1

A reaction flask was equipped with a stirrer, thermocouple and a condenser. Charge A and charge B (see table 1) were added and stirred for 15 minutes. Then, Charge C (see Table 1) was added over 5 minutes and stirred for 30 minutes. Then, 300 grams of water was added and heated to 40° C. The reaction mixture was stirred at 40° C. for six hours and then cooled to ambient temperature. The solid precipitated was filtered off, washed with acetone and dried at ambient temperature for 24 hours.

Particle Example 2

A reaction flask was equipped with a stirrer, thermocouple and a condenser. Charge A and charge B (See Table 1) were added and stirred for 15 minutes. Then, Charge C (See Table 1) was added over 5 minutes and stirred for 6 minutes. Then, 300 grams of water was added and heated to 40° C. The reaction mixture was stirred at 40° C. for 375 minutes and then cooled to ambient temperature. The solid precipitated was filtered off, washed with acetone and dried at ambient temperature for 24 hours.

Particle Example 3

A reaction flask was equipped with a stirrer, thermocouple and a condenser. Charge A and charge B (See Table 1) were added and stirred for three minutes. Then, (See Table 1) was added over 5 minutes and stirred for 32 minutes. Then, 200 grams of water was added and heated to 40° C. The reaction mixture was stirred at 40° C. for six hours and then cooled to ambient temperature. Then, five grams of triethylamine in 30 grams of water was added and stirred for an hour. The solid precipitated was filtered off, washed with acetone and dried at ambient temperature for 24 hours.

Particle Example 4

A reaction flask was equipped with a stirrer, thermocouple and a condenser. Charge A and charge B (See Table 1) were added and stirred for 45 minutes. Then, Charge C (See Table 1) was added over 5 minutes and stirred for 30 minutes. Then, 200 grams of water was added and heated to 40° C. The reaction mixture was stirred at 40° C. for two hours. Then, charge D, sparged with nitrogen stream continuously, (See Table 1) was added over thirty minutes and stirred at 40° C. for two hours. Reaction mixture was cooled to ambient temperature and nine grams of triethylamine were added, and stirred for 90 minutes. The solid precipitated was filtered off, washed with acetone and dried at ambient temperature for 24 hours.

Particle Example 5

A reaction flask was equipped with a stirrer, thermocouple and a condenser. Charge A and charge B (See Table 1) were added and stirred for 85 minutes. The temperature was raised to 75° C. and stirred at 75° C. for 55 minutes. Then, the reaction mixture was cooled to 50° C. and Charge C (See Table 1) was added over 5 minutes and stirred for 25 minutes. Then, charge D, sparged with nitrogen stream continuously during addition, (See Table 1) was added over thirty minutes and stirred at 50° C. for 375 minutes. The reaction mixture was cooled to ambient temperature and the solid precipitated was filtered off, washed with acetone and dried at ambient temperature for 24 hours.

TABLE 1

|  | Particle Example 1 | Particle Example 2 | Particle Example 3 | Particle Example 4 | Particle Example 5 |
|---|---|---|---|---|---|
| Charge A (grams) | | | | | |
| Deionized water | 200.0 | 200.0 | 200.0 | 200.0 | 800 |
| Charge B (grams) | | | | | |
| Cerium(III) acetate 1.5H$_2$O[1] | 34.0 | 0.0 | 0.0 | 0.0 | 102.0 |
| Yttrium acetate Hydrate[2] | 0.0 | 26.3 | 0.0 | 0.0 | 0.0 |
| Manganese acetate 4H$_2$O[3] | 0.0 | 0.0 | 24.2 | 0.0 | 0.0 |
| Zirconium sulfate[4] | 0.0 | 0.0 | 0.0 | 27.9 | 0.0 |
| Zinc acetate dihydrate[5] | 22.0 | 22.0 | 22.0 | 22.0 | 66.0 |
| Charge C (grams) | | | | | |
| Silquest TEOS pure silane[6] | 48.0 | 48.0 | 48.0 | 48.0 | 144.0 |
| Acetone | 200.0 | 200.0 | 200.0 | 200.0 | 600.0 |
| Charge D (grams) | | | | | |
| Triethylamine[7] | | | | 5.0 | 30.0 |
| Deionized water | | | | 50.0 | 180.0 |

[1] Available from Prochem Inc.,
[2] Available from Aldrich
[3] Available from Aldrich
[4] Available from ICN Biomedicals Inc
[5] Available from Barker Industries
[6] Available from GE silicones
[7] Available from Aldrich

Particle Example 6

A reaction flask was equipped with a stirrer, thermocouple and a condenser. Charge A and charge B (See Table 2) were added, heated to 50° C. and stirred for ten minutes. Then, Charge C (See Table 2) was added over 5 minutes and stirred for 40 minutes. Then Charge D, sparged with nitrogen stream continuously during addition, (See Table 2) was added over thirty minutes and stirred at 50° C. for six hours. The reaction mixture was cooled to ambient temperature and the solid precipitated was filtered off, washed with water and acetone sequentially and dried at ambient temperature for 24 hours.

Particle Example 7

A reaction flask was equipped with a stirrer, thermocouple and a condenser. Charge A and charge B (See Table 2) were added and stirred at 50° C. for 30 minutes. Then, the temperature was raised to 75° C. and stirred for an hour. Then, the reaction mixture was cooled to 50° C. and Charge C (See Table 2) was added over 5 minutes and stirred for 25 minutes. Then charge D (See Table 2) was added over thirty minutes and stirred at 50° C. for 320 minutes. The reaction mixture was then cooled to ambient temperature and the solid precipitated was filtered off, washed with water and acetone sequentially, and dried at ambient temperature for 24 hours.

Particle Example 8

A reaction flask was equipped with a stirrer, thermocouple and a condenser. Charge A and charge B (See Table 2) were added and the temperature was raised to 75° C. and stirred for an hour. Then, the reaction mixture was cooled to 50° C., and Charge C (See Table 2) was added over 5 minutes and stirred for 35 minutes. Then, charge D, sparged with nitrogen stream continuously during addition, (See Table 2) was added over thirty minutes and stirred at 50° C. for six hours. The reaction mixture was cooled to ambient temperature and the solid precipitated was filtered off, washed with acetone and dried at ambient temperature for 24 hours.

Particle Example 9

A reaction flask was equipped with a stirrer, thermocouple and a condenser. Charge A (See Table 1) was added and stirred at 50° C. Then, Charge B and Charge C (See Table 2) were added over two hours simultaneously. Then, the reaction mixture was stirred at 50° C. for three hours. The solid precipitated was filtered off, washed with water and acetone sequentially, and dried at ambient temperature for 48 hours. The solid obtained was ground using mortar and pestle.

Particle Example 10

A reaction flask was equipped with a stirrer, thermocouple and a condenser. Charge A (See Table 2) was added and stirred at 50° C. Charge B and Charge C (See Table 2) were added over two hours simultaneously. Then, the reaction mixture was stirred at 50° C. for three hours. The solid precipitated was filtered off, washed with water and acetone sequentially, and dried at ambient temperature for 48 hours. The solid obtained was ground using mortar and pestle.

TABLE 2

|  | Particle Example 6 | Particle Example 7 | Particle Example 8 | Particle Example 9 | Particle Example 10 |
|---|---|---|---|---|---|
| Charge A (grams) | | | | | |
| Deionized water | 676.0 | 400.0 | 3200.0 | 300.0 | 300.0 |
| Charge B | | | | | |
| Cerium(III) acetate 1.5H$_2$O[1] | 51.0 | 51.0 | 408.0 | 51.0 | 51.0 |
| Zinc acetate dihydrate[2] | 33.0 | 33.0 | 264.0 | 33.0 | 33.0 |
| Sulfuric acid ~36 N[3] | 0.0 | 0.0 | 0.0 | 0.0 | 5.9 |
| Deionized water | 0.0 | 0.0 | 0.0 | 740.0 | 740.0 |
| Charge C (grams) | | | | | |
| Silquest TEOS pure silane[4] | 144.0 | 72.0 | 576.0 | 0.0 | 0.0 |
| Acetone | 300.0 | 300.0 | 2400.0 | 0.0 | 0.0 |
| Sodium Silicate solution[5] | | | | 94.0 | 94.0 |
| Charge D (grams) | | | | | |
| Triethylamine[6] | 15.0 | 0.0 | 120.0 | | |
| Ammonium hydroxide[7] | 0.0 | 16.6 | 0.0 | | |
| Deionized water | 90.0 | 90.0 | 720.0 | | |

[1]Available from Prochem Inc.,
[2]Available from Barker Industries
[3]Available from Fischer Scientific
[4]Available from GE silicones
[5]30% solids aqueous solution; Available from PPG Industries
[6]Available from Fisher Scientific
[7]Available from Mallinckrodt

Particle Example 11

A reaction flask was equipped with a stirrer, thermocouple and a condenser. Charge A and charge B (See Table 3) were added and stirred for 30 minutes. Then, the temperature was raised to 50° C. and stirred for 105 minutes. Then, 100 grams of water was added and the reaction mixture was heated to 60° C. and stirred for 45 minutes. Then, the heat source was removed. At a reaction temperature of 34° C., charge C (See Table 3) was added over five minutes. The reaction mixture was stirred for 30 minutes at 30° C. Charge D, sparged with nitrogen stream continuously during addition, (See Table 3) was added over thirty minutes and stirred at 30° C. for 260 minutes. The reaction mixture was cooled to ambient temperature and the solid precipitated was filtered off, washed with acetone and dried at ambient conditions for 24 hours.

Particle Example 12

A reaction flask was equipped with a stirrer, thermocouple and a condenser. Charge A and charge B (See Table 3) were added and stirred for 20 minutes. Then, 100 grams of water was added and the reaction mixture was heated to 60° C. and stirred for an hour. Then, the heat source was removed. At a reaction temperature of 48° C., charge C (See Table 3) was added over two minutes. The reaction mixture was stirred for three hours while cooling to 26° C. The solid precipitated was filtered off, washed with acetone and dried at ambient temperature for 24 hours.

Particle Example 13

A reaction flask was equipped with a stirrer, thermocouple and a condenser. Charge A and charge B (See Table 3) were added, heated to 40° C. and stirred for 45 minutes. Then, the temperature was raised to 50° C. and stirred for 105 minutes. The heat source was removed and at a reaction temperature of 38° C., charge C (See Table 3) was added over two minutes. The reaction mixture was stirred for two hours while cooling to 26° C. The solid precipitated was filtered off, washed with acetone and dried at ambient temperature.

Particle Example 14

A reaction flask was equipped with a stirrer, thermocouple and a condenser. Charge A and charge B (See Table 3) were added and stirred for 15 minutes. Then, the temperature was raised to 50° C. Charge C (See Table 3) was added over five minutes and stirred for 30 minutes. Charge D, sparged with nitrogen stream continuously during addition, (See Table 3) was added over thirty minutes and stirred at 50° C. for four hours. The reaction mixture was cooled to ambient temperature and the solid precipitated was filtered off, washed with water and acetone sequentially and dried at ambient temperature for 24 hours.

TABLE 3

|  | Particle Example 11 | Particle Example 12 | Particle Example 13 | Particle Example 14 |
|---|---|---|---|---|
| Charge A (grams) | | | | |
| Deionized water | 200.0 | 200.0 | 200.0 | 300.0 |
| Charge B (grams) | | | | |
| Cerium (III) acetate 1.5H$_2$O[1] | 34.0 | 34.0 | 34.0 | 0.0 |
| Zinc acetate dihydrate[2] | 22.0 | 22.0 | 22.0 | 33.0 |
| Magnesium(II)acetate.4H$_2$O[3] | 21.2 | 21.2 | 0.0 | 31.8 |
| Charge C (grams) | | | | |
| Silquest TEOS pure silane[4] | 48.0 | 0.0 | 0.0 | 72.0 |
| Acetone | 200.0 | 0.0 | 0.0 | 300.0 |
| Phosphoric acid 85%[5] | 0.0 | 40.3 | 0.0 | 0.0 |
| Sodium metasilicate[6] | 0.0 | 0.0 | 48.0 | 0.0 |
| Deionized water | 0.0 | 50.0 | 100.0 | 0.0 |
| Charge D (grams) | | | | |
| Triethylamine[7] | 10.0 | | | 15.0 |
| Deionized water | 60.0 | | | 90.0 |

[1] Available from Prochem Inc.,
[2] Available from Barker Industries
[3] Available from Acros Organics
[4] Available from GE silicones
[5] Available from Fisher Scientific
[6] Available from Aldrich
[7] Available from Fisher Scientific Particle Example 15

To a reaction flask, charge A and Charge B (see Table 3a) were added and stirred for 15 minutes. Then, Charge C (see Table 3a) was added over five minutes and stirred for 150 minutes. Then, 20 grams of deionized water was added and stirred for 40 minutes. The precipitated solid was filtered off, washed with water and acetone sequentially and air dried for 24 hours.

Particle Example 16

A reaction flask was equipped with a stirrer, thermocouple and a condenser. Charge A and charge B (see Table 3a) were added, heated to 50° C. and stirred for an hour. Then, charge C (see Table 3a) was added over 5 minutes and stirred for 30 minutes. Then, charge D, sparged with nitrogen stream continuously during addition, ((see Table 3a) was added over thirty minutes and stirred for three hours. The solid precipitated was filtered off, washed with acetone and dried at ambient temperature for 24 hours.

TABLE 3A

|  | Particle Example 15 | Particle Example 16 |
|---|---|---|
| Charge A (grams) | | |
| Deionized water | 50.0 | 800 |
| Charge B (grams) | | |
| Cerium (III) acetate 1.5H$_2$O[1] | 8.8 | 51.0 |
| Zinc acetate dihydrate[2] | 4.8 | 99.0 |

TABLE 3A-continued

|  | Particle Example 15 | Particle Example 16 |
|---|---|---|
| Charge C (grams) | | |
| Silquest TEOS pure silane[3] | 0.0 | 144.0 |
| Acetone | 0.0 | 600.0 |
| Laponite RD[4] | 20.0 | |
| Charge D (grams) | | |
| Triethylamine[5] | | 30.0 |
| Deionized water | | 180.0 |

[1]Available from Prochem Inc.,
[2]Available from Barker Industries
[3]Available from GE silicones
[4]Synthetic clay available from Southern Clay Products, Inc.
[5]Available from Fisher Scientific Particle Example 17

A suitable reaction vessel equipped for vacuum distillation was flushed with nitrogen gas. To the flask was added 1600 grams of Snowtex O (a 20% solution of colloidal silica in water available from Nissan Chemical). A mixture of 6.5 grams of trimethoxysilylpropyl methacrylate in 154 grams of water with the pH adjusted to 5.0 with acetic acid was added to the flask over 5 minutes at ambient temperature. The mixture was stirred for 45 minutes at ambient temperature. Then 64 grams of vinyl trimethoxysilane was added to the reaction mixture over 5 minutes. The reaction mixture was again stirred for 45 minutes at ambient temperature. A total of 1280 grams of butyl Cellosolve was then added to the reaction mixture over about 20 minutes at ambient temperature. The mixture was again stirred for 45 minutes at ambient temperature. The mixture was slowly heated to 90° C. and vacuum distilled. A total of 1679 grams of distillate was removed. The final mixture was a slightly hazy, low viscosity mixture about 29% solids as measured at 110° C. for 60 minutes.

Coating Composition Examples 1A to 1E

Coating compositions were prepared using the components and weights (in grams) shown in Table 4. All materials in the A pack of the formulation, were added under agitation with a Cowles blade in the order listed up to ethanol. 17.42 grams of ethanol was held out from the total until later in the preparation. Next, the poly(vinyl butyral) resin was slowly added while still under agitation and left to mix for 15 minutes. Epoxy resin was then added. Next, corrosion resisting particles, if any, and pigment(s) were added with heavy mixing for about ten minutes. Then, the rest of the ethanol and other solvents were slowly added. This final mixture was allowed to mix for ten minutes and was then added to a sealed 8 ounce glass container containing approximately 150 grams of the above material to approximately 125 grams of zircoa beads. This sealed container was then left on a paint shaker for two to 4 hours. After removing the paste from the paint shaker, the milling beads were filtered out with a standard paint filter and the finished material was ready.

The B pack of the formulation was prepared by adding the components to a suitable vessel under agitation with a paddle blade and allowing to mix for 20 minutes. When ready to spray, the two compositions were mixed.

TABLE 4

| Pack | Material | Example 1A | Example 1B | Example 1C | Example 1D | Example 1E |
|---|---|---|---|---|---|---|
| A | DOWANOL PM[1] | 9.18 | 9.18 | 9.18 | 9.18 | 9.18 |
| A | BLS-2700[2] | 10.17 | 10.17 | 10.17 | 10.17 | 10.17 |
| A | Ethanol[3] | 56.51 | 56.51 | 56.51 | 56.51 | 56.51 |
| A | Butvar B-90[4] | 6.9 | 6.9 | 6.9 | 6.9 | 6.9 |
| A | EPON 834-X-80[5] | 3 | 3 | 3 | 3 | 3 |
| A | Particle Example 5 | — | 2.26 | — | — | — |
| A | Particle Example 9 | — | — | 2.26 | — | — |
| A | Particle Example 10 | — | — | — | 2.26 | — |
| A | Particle Example 7 | — | — | — | — | 2.26 |
| A | K-White G105[6] | 2.26 | 2.26 | 2.26 | 2.26 | 2.26 |
| A | Aerosil 200[7] | 0.6 | 0.6 | 0.6 | 0.6 | 0.6 |
| A | Toluene[8] | 6.91 | 6.91 | 6.91 | 6.91 | 6.91 |
| A | Xylene[9] | 5.19 | 5.19 | 5.19 | 5.19 | 5.19 |
| A | Isobutyl Alcohol[10] | 5.89 | 5.89 | 5.89 | 5.89 | 5.89 |
| B | Ethanol[3] | 85.28 | 85.28 | 85.28 | 85.28 | 85.28 |
| B | Butanol[11] | 9.43 | 9.43 | 9.43 | 9.43 | 9.43 |
| B | Phosphoric Acid 85%[12] | 1.59 | 1.59 | 1.59 | 1.59 | 1.59 |
| B | Deionized Water | 0.09 | 0.09 | 0.09 | 0.09 | 0.09 |

[1]Propylene glycol monomethyl ether commercially available from BASF Corp.
[2]Phenolic resin commercially available from Georgia Pacific
[3]Organic solvent commercially available from ChemCentral Corp.
[4]Poly (vinyl butyral) resin commercially available from Solutia Inc.
[5]Epichlorohydrin-Bisphenol A resin commercially available from Resolution Performance Products
[6]Aluminum triphosphate compound commercially available from Tayca
[7]Silicon dioxide commercially available from Cabot Corp.
[8]Commercially available from Ashland Chemical Co.
[9]Commercially available from Ashland Chemical Co.
[10]Commercially available from Avecia.
[11]Commercially available from BASF Corp.
[12]Commercially available from Akzo Chemicals Inc.

Test Substrates

The compositions of Table 4, as well as Examples 1F and 1G (described below), were applied to the test substrates identified in Table 5. The substrates were prepared by first cleaning with a wax and greater remover (DX330, commercially available from PPG Industries, Inc.) and allowed to dry. The panels were then sanded with 180 grit using a DA orbital sander and again cleaned with DX330. The compositions were applied using a DeVilbiss GTI HVLP spray gun with a 1.4 spray tip, N2000 Cap, and 30 psi at gun. Each composition was applied in two coats with a five-minute flash in between to film builds of 0.50 to approximately 1.25 mils (12.7 to 31.8 microns). A minimum of twenty to thirty minutes and no more than one hour of time was allowed to elapse before applying a PPG Industries, Inc. global sealer D 839 over each composition. The sealer was mixed and applied as a wet-on-wet sealer to approximately 1.0 to 2.0 mils (25.4 to 50.8 microns) of paint and allowed to flash forty-five minutes before applying base coat. Deltron DBC base coat, commercially available from PPG Industries, Inc., was applied over the sealer in two coats with five to ten minutes flash time between coats to a film build thickness of approximately 0.5 mils (12.7 microns). The base coat was allowed approximately fifteen minutes time to flash before applying D893 Global clear coat, commercially available from PPG Industries, Inc., in two coats with five to ten minutes to flash between coats to a film build of 2.50 to 3.00 mils (63.5 to 76.2 microns). Sealer, base coat, and clear coat were mixed as the procedure for these products recommended by PPG Industries, Inc. Salt spray resistance was tested as described in ASTM B117. Panels removed from salt spray testing after 1000 hours were measured for scribe creep across the scribe. Scribe creep values were reported as an average of six (6) measurements. Results are illustrated in Table 5, with lower value indicated better corrosion resistance results.

TABLE 5

| Substrate | Example 1A | Example 1B | Example 1C | Example 1D | Example 1E | Example 1F[13] | Example 1G[14] |
|---|---|---|---|---|---|---|---|
| Cold Rolled Steel (APR10288) | 4.3 | 11.1 | 9.5 | 3.9 | 8.3 | 22 | 0 |
| G-60 Galvanized (APR18661) | 7.2 | 3.3 | 1.1 | 0 | 0 | 4.3 | 0 |
| Aluminum (APR21047) | 10.5 | Delaminated | Delaminated | Delaminated | Delaminated | 1 | 0 |

[13] D-831 commercially available from PPG Industries, Inc., Pittsburgh, PA.
[14] D8099 Fast Drying-Anti-Corrosion Etch Primer commercially available from PPG Industries, Inc., Pittsburgh, PA.

Coating Composition Examples 2A to 2F

Coating compositions were prepared using the components and weights (in grams) shown in Table 6. Coatings were prepared in the same manner as described for Coating Composition Examples 1A to 1E.

TABLE 6

| Pack | Material | Example 2A | Example 2B | Example 2C | Example 2D | Example 2E | Example 2F |
|---|---|---|---|---|---|---|---|
| A | DOWANOL PM[1] | 9.18 | 9.18 | 9.18 | 9.18 | 9.18 | 9.18 |
| A | BLS-2700[2] | 10.17 | 10.17 | 10.17 | 10.17 | 10.17 | 10.17 |
| A | Ethanol[3] | 56.51 | 56.51 | 56.51 | 56.51 | 56.51 | 56.51 |
| A | Butvar B-90[4] | 6.9 | 6.9 | 6.9 | 6.9 | 6.9 | 6.9 |
| A | EPON 834-X-80[5] | 3 | 3 | 3 | 3 | 3 | 3 |
| A | Particle Example 5 | — | 2.26 | — | — | — | — |
| A | Particle Example 10 | — | — | — | — | — | 2.26 |
| A | Particle Example 8 | — | — | 2.26 | — | — | — |
| A | Particle Example 15 | — | — | — | 2.26 | — | — |
| A | Particle Example 6 | — | — | — | — | 2.26 | — |
| A | K-White G105[6] | 2.26 | 2.26 | 2.26 | 2.26 | 2.26 | 2.26 |
| A | Aerosil 200[7] | 0.6 | 0.6 | 0.6 | 0.6 | 0.6 | 0.6 |
| A | Toluene[8] | 6.91 | 6.91 | 6.91 | 6.91 | 6.91 | 6.91 |
| A | Xylene[9] | 5.19 | 5.19 | 5.19 | 5.19 | 5.19 | 5.19 |
| A | Isobutyl Alcohol[10] | 5.89 | 5.89 | 5.89 | 5.89 | 5.89 | 5.89 |
| B | Ethanol[3] | 85.28 | 85.28 | 85.28 | 85.28 | 85.28 | 85.28 |
| B | Butanol[11] | 9.43 | 9.43 | 9.43 | 9.43 | 9.43 | 9.43 |
| B | Phosphoric Acid 85%[12] | 1.59 | 1.59 | 1.59 | 1.59 | 1.59 | 1.59 |
| B | Deionized Water | 0.09 | 0.09 | 0.09 | 0.09 | 0.09 | 0.09 |

Test Substrates

The compositions of Table 6, as well as Examples 2F and 2G (described below), were applied to the test substrates identified in Table 7 using the same procedure as was described above for Coating Composition Examples 1A to 1G. Results are illustrated in Table 7, with lower value indicated better corrosion resistance results.

TABLE 7

| Substrate | Example 2A | Example 2B | Example 2C | Example 2D | Example 2E | Example 2F | Example 2G[13] | Example 2H[14] |
|---|---|---|---|---|---|---|---|---|
| Cold Rolled Steel (APR10288) | 4.2 | 11.3 | 2.3 | 10 | 7.7 | 13.7 | 23 | 10.3 |
| G-60 Galvanized (APR18661) | 5.3 | 2 | 1.2 | 0.9 | 0 | 0.5 | 1.3 | 0 |
| Aluminum (APR21047) | Delaminated | Delaminated | Delaminated | Delaminated | Delaminated | Delaminated | 0.5 | 0 |

Coating Composition Examples 3A to 3D

Coating compositions were prepared using the components and weights (in grams) shown in Table 8. Coatings were prepared in the same manner as described for Coating Composition Examples 1A to 1E.

Test Substrates

The compositions of Table 8, as well as Examples 3E and 3F (described below), were applied to the test substrates identified in Table 9 using the same procedure as was described above for Coating Composition Examples 1A to 1G. Results are illustrated in Table 9, with lower value indicated better corrosion resistance results.

TABLE 9

| Substrate | Example 3A | Example 3B | Example 3C | Example 3D | Example 3E[15] | Example 3F[14] |
|---|---|---|---|---|---|---|
| Cold Rolled Steel (APR10288) | Delaminated | 12.7 | 9 | 14.5 | Delaminated | 2.7 |
| G-60 Galvanized (APR18661) | 14.3 | 7.2 | 7 | 9.3 | 11.8 | 2.2 |
| Aluminum (APR21047) | 6.2 | 9.2 | 4.7 | 4.5 | 4.7 | 0.5 |

[15]DPX-171 commercially available from PPG Industries, Inc., Pittsburgh, PA.

TABLE 8

| Pack | Material | Example 3A | Example 3B | Example 3C | Example 3D |
|---|---|---|---|---|---|
| A | DOWANOL PM[1] | 8.82 | 9.18 | 9.18 | 9.18 |
| A | BLS-2700[2] | 9.77 | 10.17 | 10.17 | 10.17 |
| A | Ethanol[3] | 54.28 | 56.51 | 56.51 | 56.51 |
| A | Butvar B-90[4] | 6.63 | 6.9 | 6.9 | 6.9 |
| A | EPON 834-X-80[5] | 2.88 | — | — | — |
| A | Particle Example 5 | 2.17 | — | — | — |
| A | Particle Example 12 | — | 2.17 | — | — |
| A | Particle Example 13 | — | — | — | 2.17 |
| A | Particle Example 14 | — | — | 2.17 | — |
| A | Aerosil 200[7] | 0.58 | 0.58 | 0.58 | 0.58 |
| A | Toluene[8] | 6.64 | 6.64 | 6.64 | 6.64 |
| A | Xylene[9] | 4.99 | 4.99 | 4.99 | 4.99 |
| A | Isobutyl Alcohol[10] | 5.66 | 5.66 | 5.66 | 5.66 |
| B | Ethanol[3] | 81.92 | 81.92 | 81.92 | 81.92 |
| B | Butanol[11] | 9.06 | 9.06 | 9.06 | 9.06 |
| B | Phosphoric Acid 85%[12] | 1.53 | 1.53 | 1.53 | 1.53 |
| B | Deionized Water | 0.09 | 0.09 | 0.09 | 0.09 |

Coating Composition Example 4A

Coating composition 4A was prepared using the components and weights (in grams) shown in Table 10. The coating was prepared in the same manner as described for Coating Composition Examples 1A to 1E.

TABLE 10

| Pack | Material | Example 4A |
|---|---|---|
| A | DOWANOL PM[1] | 9.18 |
| A | BLS-2700[2] | 10.17 |
| A | Ethanol[3] | 56.51 |
| A | Butvar B-90[4] | 6.9 |
| A | EPON 834-X-80[5] | 3 |
| A | Particle Example 11 | 2.26 |
| A | Aerosil 200[7] | 0.6 |
| A | Toluene[8] | 6.91 |
| A | Xylene[9] | 5.19 |
| A | Isobutyl Alcohol[10] | 5.89 |
| B | Ethanol[3] | 85.28 |

TABLE 10-continued

| Pack | Material | Example 4A |
|---|---|---|
| B | Butanol[11] | 9.43 |
| B | Phosphoric Acid 85%[12] | 1.59 |
| B | Deionized Water | 0.09 |

Test Substrates

The composition of Table 10, as well as Examples 4B and 4C (described below), were applied to the test substrates identified in Table 11 using the same procedure as was described above for Coating Composition Examples 1A to 1G. Results are illustrated in Table 11, with lower value indicated better corrosion resistance results.

TABLE 11

| Substrate | Example 4A | Example 4B[15] | Example 4C[14] |
|---|---|---|---|
| Cold Rolled Steel (APR10288) | 2.1 | 24.2 | 0 |
| G-60 Galvanized (APR18661) | 7.3 | 2 | 0 |
| Aluminum (APR21047) | Delaminated | 0.7 | 0 |

Coating Composition Examples 5A to 5G

Coating compositions were prepared using the components and weights (in grams) shown in Table 12. Coatings were prepared in the same manner as described for Coating Composition Examples 1A to 1E.

TABLE 12

| Pack | Material | Example 5A | Example 5B | Example 5C | Example 5D | Example 5E | Example 5F | Example 5G |
|---|---|---|---|---|---|---|---|---|
| A | DOWANOL PM[1] | 9.18 | 9.18 | 9.18 | 9.18 | 9.18 | 9.18 | 9.18 |
| A | BLS-2700[2] | 10.17 | 10.17 | 10.17 | 10.17 | 10.17 | 10.17 | 10.17 |
| A | Ethanol[3] | 56.51 | 56.51 | 56.51 | 56.51 | 56.51 | 56.51 | 56.51 |
| A | Butvar B-90[4] | 6.9 | 6.9 | 6.9 | 6.9 | 6.9 | 6.9 | 6.9 |
| A | Zinc chromate[16] | 2.26 | — | — | — | — | — | — |
| A | Magnesium Oxide[17] | — | 2.26 | — | — | — | — | — |
| A | Particle Example 1 | — | — | 2.26 | — | — | — | — |
| A | Particle Example 2 | — | — | — | 2.26 | — | — | — |
| A | Particle Example 3 | — | — | — | — | 2.26 | — | — |
| A | Particle Example 4 | — | — | — | — | — | 2.26 | — |
| A | Nalzin-2[18] | — | — | — | — | — | — | 2.26 |
| A | Aerosil 200[7] | 0.6 | 0.6 | 0.6 | 0.6 | 0.6 | 0.6 | 0.6 |
| A | Toluene[8] | 6.91 | 6.91 | 6.91 | 6.91 | 6.91 | 6.91 | 6.91 |
| A | Xylene[9] | 5.18 | 5.18 | 5.18 | 5.18 | 5.18 | 5.18 | 5.18 |
| A | Isobutyl Alcohol[10] | 5.89 | 5.89 | 5.89 | 5.89 | 5.89 | 5.89 | 5.89 |
| B | Ethanol[3] | 85.28 | 85.28 | 85.28 | 85.28 | 85.28 | 85.28 | 85.28 |
| B | Butanol[11] | 9.43 | 9.43 | 9.43 | 9.43 | 9.43 | 9.43 | 9.43 |
| B | Phosphoric Acid 85%[12] | 1.59 | 1.59 | 1.59 | 1.59 | 1.59 | 1.59 | 1.59 |
| B | Deionized Water | 0.09 | 0.09 | 0.09 | 0.09 | 0.09 | 0.09 | 0.09 |

[16]Zinc tetroxy chromate commercially available from PMG Colours.

[17]Magnesium oxide, average primary particle size of 20 nanometers, commercially available from Nanostructured & Amorphous Materials, Inc.

[18]Zinc hydroxyl phosphate anti-corrosion pigment commercially available from Elementis Specialties, Inc.

Test Substrates

The compositions of Table 12, as well as Examples 5H and 5I (described below), were applied to the test substrates identified in Table 13 using the same procedure as was described above for Coating Composition Examples 1A to 1G. Results are illustrated in Table 13, with lower value indicated better corrosion resistance results.

TABLE 13

| Substrate | Ex. 5A | Ex. 5B | Ex. 5C | Ex. 5D | Ex. 5E | Ex. 5F | Ex. 5G | Ex. 5H[15] | Ex. 5I[14] |
|---|---|---|---|---|---|---|---|---|---|
| Cold Rolled Steel (APR10288) | 6.2 | 4 | 0.7 | 1.3 | 3.3 | 0 | 13 | 10.7 | 8.2 |
| G-60 Galvanized (APR18661) | 10.7 | 5.2 | 15.2 | 13.2 | 11.8 | 14.3 | 15.6 | 10 | 7.8 |
| Aluminum (PR21047) | Delam. | 1 | Delam. | Delam. | Delam. | Delam. | Delam. | 6.2 | 0 |

Coating Composition Examples 6A to 6H

Coating compositions were prepared using the components and weights (in grams) shown in Table 14. Coatings were prepared in the same manner as described for Coating Composition Examples 1A to 1E.

TABLE 14

| Pack | Material | Example 6A | Example 6B | Example 6C | Example 6D | Example 6E | Example 6F | Example 6G | Example 6H |
|---|---|---|---|---|---|---|---|---|---|
| A | DOWANOL PM[1] | 9.18 | 9.18 | 9.18 | 9.18 | 9.18 | 9.18 | 9.18 | 9.18 |
| A | BLS-2700[2] | 10.17 | 10.17 | 10.17 | 10.17 | 10.17 | 10.17 | 10.17 | 10.17 |
| A | Ethanol[3] | 56.51 | 56.51 | 56.51 | 56.51 | 56.51 | 56.51 | 56.51 | 56.51 |
| A | ButvarB-90[4] | 6.9 | 6.9 | 6.9 | 6.9 | 6.9 | 6.9 | 6.9 | 6.9 |
| A | EPON 834-X-80[5] | 3 | — | — | — | 3 | — | 3 | 3 |
| A | Magnesium Oxide[17] | — | 2.26 | — | — | — | 2.26 | 2.26 | 2.26 |
| A | Particle Example 1 | — | — | 2.26 | — | 2.26 | 2.26 | — | 2.26 |
| A | Particle Example 11 | 2.26 | 2.26 | — | 2.26 | — | — | 2.26 | — |
| A | K-White G105[6] | — | — | — | 2.26 | 2.26 | 2.26 | 2.26 | — |
| A | Aerosil 200[7] | 0.6 | 0.6 | 0.6 | 0.6 | 0.6 | 0.6 | 0.6 | 0.6 |
| A | Toluene[8] | 6.91 | 6.91 | 6.91 | 6.91 | 6.91 | 6.91 | 6.91 | 6.91 |
| A | Xylene[9] | 5.18 | 5.18 | 5.18 | 5.18 | 5.18 | 5.18 | 5.18 | 5.18 |
| A | Isobutyl Alcohol[10] | 5.89 | 5.89 | 5.89 | 5.89 | 5.89 | 5.89 | 5.89 | 5.89 |
| B | Ethanol[3] | 85.28 | 85.28 | 85.28 | 85.28 | 85.28 | 85.28 | 85.28 | 85.28 |
| B | Butanol[11] | 9.43 | 9.43 | 9.43 | 9.43 | 9.43 | 9.43 | 9.43 | 9.43 |
| B | Phosphoric Acid 85%[12] | 1.59 | 1.59 | 1.59 | 1.59 | 1.59 | 1.59 | 1.59 | 1.59 |
| B | Deionized Water | 0.09 | 0.09 | 0.09 | 0.09 | 0.09 | 0.09 | 0.09 | 0.09 |

Test Substrates

The compositions of Table 14, as well as Examples 6I and 6J (described below), were applied to the test substrates identified in Table 15 using the same procedure as was described above for Coating Composition Examples 1A to 1G. Results are illustrated in Table 15, with lower value indicated better corrosion resistance results.

TABLE 15

| Substrate | Ex. 6A | Ex. 6B | Ex. 6C | Ex. 6D | Ex. 6E | Ex. 6F | Ex. 6G | Ex. 6H | Ex. 6I[15] | Ex. 6J[14] |
|---|---|---|---|---|---|---|---|---|---|---|
| Cold Rolled Steel (APR10288) | 2.1 | 2.5 | 0 | 0 | 0 | 0 | 0.5 | 13.7 | 24.2 | 0 |
| G-60 Galvanized (APR18661) | 7.3 | 3.2 | 4.4 | 2.6 | 2.7 | 0.5 | 0.7 | 0.5 | 2 | 0 |
| Aluminum (APR21047) | Delam. | 0 | Delam. | Delam. | 0.5 | 0 | 0 | 0 | 0.7 | 0 |

Coating Composition Example 7A

Coating composition 7A was prepared using the components and weights (in grams) shown in Table 16. The coating was prepared in the same manner as described for Coating Composition Examples 1A to 1E.

TABLE 16

| Pack | Material | Example 7A |
| --- | --- | --- |
| A | DOWANOL PM[1] | 3.1 |
| A | BLS-2700[2] | 9.86 |
| A | Ethanol[3] | 54.75 |
| A | Butvar B-90[4] | 6.68 |
| A | EPON 834-X-80[5] | 3.44 |
| A | Particle Example 17 | 20.82 |
| A | 2-mercaptobenzothiazole | 1.01 |
| A | Aerosil 200[7] | 0.58 |
| A | Toluene[8] | 6.69 |
| A | Xylene[9] | 5.03 |
| A | Isobutyl Alcohol[10] | 5.71 |
| B | Ethanol[3] | 82.63 |
| B | Butanol[11] | 9.14 |
| B | Phosphoric Acid 85%[12] | 2.6 |
| B | Deionized Water | 0.09 |

Test Substrates

The composition of Table 16, as well as Examples 7B and 7C (described below), were applied to the test substrates identified in Table 17 using the same procedure as was described above for Coating Composition Examples 1A to 1G. Results are illustrated in Table 17, with lower value indicated better corrosion resistance results.

TABLE 17

| Substrate | Example 7A | Example 7B[15] | Example 7C[14] |
| --- | --- | --- | --- |
| Cold Rolled Steel (APR10288) | 0.5 | 17.4 | 0.3 |
| G-60 Galvanized (APR18661) | 0.1 | 4.4 | 0 |
| Aluminum (APR21047) | 0.4 | Delaminated | 0 |

Coating Compositions Examples 8A to 8B

Coating compositions 8A and 8B were prepared using the components and weights (in grams) shown in Table 18. The coatings were prepared in the same manner as described for Coating Composition Examples 1A to 1E.

TABLE 18

| Pack | Material | Example 8A | Example 8B |
| --- | --- | --- | --- |
| A | DOWANOL PM[1] | 10.55 | 3.68 |
| A | BLS-2700[2] | 11.7 | 11.7 |
| A | Ethanol[3] | 65.35 | 64.97 |
| A | Butvar B-90[4] | 7.93 | 7.93 |
| A | Zinc Tetroxy Chromate | 2.6 | — |
| A | Particle Example 17 | — | 9.52 |
| A | Aerosil 200[7] | 0.69 | 0.69 |
| A | Toluene[8] | 7.95 | 7.94 |
| A | Xylene[9] | 5.97 | 5.97 |
| A | Isobutyl Alcohol[10] | 6.77 | 6.77 |
| B | Ethanol[3] | 98.07 | 98.05 |
| B | Butanol[11] | 10.85 | 10.85 |
| B | Phosphoric Acid 85%[12] | 1.83 | 1.83 |
| B | Deionized Water | 0.11 | 0.11 |

Test Substrates

The compositions of Table 18, as well as Examples 8C and 8D (described below), were applied to the test substrates identified in Table 19 using the same procedure as was described above for Coating Composition Examples 1A to 1G. Results are illustrated in Table 19, with lower value indicated better corrosion resistance results.

TABLE 19

| Substrate | Example 8A | Example 8B | Example 8C[15] | Example 8D[13] |
| --- | --- | --- | --- | --- |
| Cold Rolled Steel (APR10288) | 8.3 | 2.3 | 25.3 | 24.1 |
| G-60 Galvanized (APR18661) | 12.8 | 3.5 | 8.2 | 8.9 |
| Aluminum (APR21047) | 1.4 | Delaminated | 8.9 | 3.7 |

Coating Compositions Examples 9A to 9B

Coating compositions 9A and 9B were prepared using the components and weights (in grams) shown in Table 20. The coatings were prepared in the same manner as described for Coating Composition Examples 1A to 1E.

TABLE 20

| Pack | Material | Example 9A | Example 9B |
| --- | --- | --- | --- |
| A | DOWANOL PM[1] | 3.17 | 3.13 |
| A | BLS-2700[2] | 9.86 | 9.86 |
| A | Ethanol[3] | 56.05 | 55.34 |
| A | Butvar B-90[4] | 6.68 | 6.68 |
| A | EPON 834-X-80[5] | 3.44 | 3.44 |
| A | VANSIL ® W-50[16] | 20 | 20 |
| A | Particle Example 17 | — | 9.55 |
| A | 2-mercaptobenzothiazole | 1.01 | 1.01 |
| A | NANOBYK-3650 | 8.59 | — |
| A | Aerosil 200[7] | 0.6 | 0.6 |
| A | Toluene[8] | 6.85 | 6.76 |
| A | Xylene[9] | 5.15 | 5.08 |
| A | Isobutyl Alcohol[10] | 5.85 | 5.77 |
| B | Ethanol[3] | 82.63 | 82.63 |
| B | Butanol[11] | 9.14 | 9.14 |
| B | Phosphoric Acid 85%[12] | 2.6 | 2.6 |
| B | Deionized Water | 0.09 | 0.09 |

[16]Wollastonite (calcium metasilicate) commercially available from R.T. Vanderbilt Co., Inc.

Test Substrates

The compositions of Table 20, as well as Examples 9C and 9D (described below), were applied to the test substrates identified in Table 21 using the same procedure as was described above for Coating Composition Examples 1A to 1G. Results are illustrated in Table 21, with lower value indicated better corrosion resistance results.

TABLE 21

| Substrate | Example 9A | Example 9B | Example 9C[13] | Example 9D[13] |
|---|---|---|---|---|
| Cold Rolled Steel (APR10288) | 5.6 | 2.1 | 15.2 | 5 |
| G-60 Galvanized (APR18661) | 1.7 | 1.8 | 6.3 | 0 |
| Aluminum (APR21047) | 0 | 0 | 5.2 | 0 |

Coating Compositions Examples 10A to 10C

Coating compositions 10A to 10C were prepared using the components and weights (in grams) shown in Table 22. The coatings were prepared in the same manner as described for Coating Composition Examples 1A to 1E.

TABLE 22

| Pack | Material | Example 10A | Example 10B | Example 10C |
|---|---|---|---|---|
| A | DOWANOL PM[1] | 9.18 | 3.1 | 3.1 |
| A | BLS-2700[2] | 10.17 | 9.86 | 9.86 |
| A | Ethanol[3] | 56.51 | 54.75 | 54.75 |
| A | Butvar B-90[4] | 6.9 | 6.68 | 6.68 |
| A | EPON 834-X-80[5] | 3 | 3.44 | 3.44 |
| A | Talc[17] | — | 20 | 20 |
| A | Particle Example 17 | — | 10.41 | — |
| A | 2-mercaptobenzothiazole | — | 1.01 | 1.01 |
| A | NANOBYK-3650 | — | — | 8.9 |
| A | Aerosil 200[7] | 0.6 | 0.58 | 0.58 |
| A | Toluene[8] | 6.91 | 6.69 | 6.69 |
| A | Xylene[9] | 5.19 | 5.03 | 5.03 |
| A | Isobutyl Alcohol[10] | 5.89 | 5.71 | 5.71 |
| B | Ethanol[3] | 85.28 | 85.28 | 85.28 |
| B | Butanol[11] | 9.43 | 9.43 | 9.43 |
| B | Phosphoric Acid 85%[12] | 1.59 | 1.59 | 1.59 |
| B | Deionized Water | 0.09 | 0.09 | 0.09 |

[17]Available from Barretts Minerals

Test Substrates

The compositions of Table 22, as well as Examples 10D and 10E (described below), were applied to the test substrates identified in Table 23 using the same procedure as was described above for Coating Composition Examples 1A to 1G. Results are illustrated in Table 23, with lower value indicated better corrosion resistance results.

TABLE 23

| Substrate | Example 10A | Example 10B | Example 10C | Example 10D[13] | Example 10E[13] |
|---|---|---|---|---|---|
| Cold Rolled Steel (APR10288) | De-laminated | 4.8 | 1 | 23 | 1.8 |
| G-60 Galvanized (APR18661) | 19.5 | 9.3 | 5 | 9.2 | 0.5 |
| Aluminum (APR21047) | 23.5 | 8.2 | 0 | 1.5 | 0 |

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A coating composition comprising:
    (a) an adhesion promoting component, wherein the adhesion promoting component comprises at least one of a free acid, ester of a free acid, amide of a free acid, metal complex of a free acid, organophosphate, organoohosohonate, and phosphatized epoxy resin, and wherein the free acid is selected from the group consisting of tannic acid, gallic acid, phosphoric acid, phosphorous acid, citric acid, and malonic acid, and wherein the composition comprises 0.05 to 20 wt. % of the adhesion promoting component based on the total weight of the coating composition;
    (b) corrosion resisting particles comprising an inorganic oxide network comprising a molecular chain of two or more different inorganic materials chemically connected to each other through one or more oxygen atoms, wherein the two or more different inorganic materials comprise:
        (i) silicon; and
        (ii) at least one of zinc, zirconium, cerium, yttrium, manganese, magnesium, and calcium; and
    (c) a film forming resin,
    wherein the coating composition is non-aqueous.

2. The coating composition of claim 1, wherein the composition is an etch primer.

3. The coating composition of claim 1, wherein the composition is substantially free of chromium containing material.

4. The coating composition of claim 1, wherein the particles comprising the inorganic oxide network are formed from hydrolysis of metal salts.

5. The coating composition of claim 1, wherein the particles comprising the inorganic oxide network are ultrafine particles.

6. The coating composition of claim 1, wherein the film-forming resin comprises a polyvinyl polymer.

7. The coating composition of claim 1, wherein the composition further comprises a phenolic resin and an alkoxysilane.

8. The coating composition of claim 1, wherein the composition further comprises corrosion resisting particles comprising a clay.

9. The coating composition of claim 1, wherein the corrosion resisting particles have an average primary particle size of no more than 500 nanometers.

10. A metal substrate at least partially coated with the coating composition of claim 1.

11. A multi-component composite coating deposited on a metal substrate comprising:
    a first coating layer deposited on at least a portion of the substrate, wherein the first coating layer comprises the coating composition according to claim 1; and
    a second coating layer deposited on at least a portion of the first coating layer.

12. The multi-component composite coating of claim 11, wherein the second coating layer is pigmented.

* * * * *